United States Patent
Satchivi et al.

(10) Patent No.: US 12,465,050 B2
(45) Date of Patent: *Nov. 11, 2025

(54) COMPOSITIONS COMPRISING A PYRIDINE CARBOXYLATE HERBICIDE AND PROTOPORPHYRINOGEN OXIDASE (PROTOX) INHIBITOR HERBICIDES

(71) Applicant: Corteva Agriscience LLC, Indianapolis, IN (US)

(72) Inventors: Norbert M. Satchivi, Carmel, IN (US); Jeremy Kister, Carmel, IN (US)

(73) Assignee: CORTEVA AGRISCIENCE LLC

( * ) Notice: Subject to any disclaimer, the term of this patent is extended or adjusted under 35 U.S.C. 154(b) by 657 days.

This patent is subject to a terminal disclaimer.

(21) Appl. No.: 17/289,344

(22) PCT Filed: Nov. 4, 2019

(86) PCT No.: PCT/US2019/059606
§ 371 (c)(1),
(2) Date: Apr. 28, 2021

(87) PCT Pub. No.: WO2020/096932
PCT Pub. Date: May 14, 2020

(65) Prior Publication Data
US 2021/0392888 A1    Dec. 23, 2021

Related U.S. Application Data

(60) Provisional application No. 62/756,703, filed on Nov. 7, 2018.

(51) Int. Cl.
| *A01N 43/40* | (2006.01) |
| *A01N 33/22* | (2006.01) |
| *A01N 37/48* | (2006.01) |
| *A01N 43/54* | (2006.01) |
| *A01N 43/56* | (2006.01) |
| *A01N 43/653* | (2006.01) |
| *A01N 43/90* | (2006.01) |

(52) U.S. Cl.
CPC ................... *A01N 43/40* (2013.01)

(58) Field of Classification Search
CPC ................. A01N 43/40; A01N 37/48
See application file for complete search history.

(56) References Cited

U.S. PATENT DOCUMENTS

| 4,044,140 | A | 8/1977 | Sherlock |
| 4,698,093 | A | 10/1987 | Lee et al. |
| 4,877,897 | A | 10/1989 | Swithenbank et al. |
| 9,179,676 | B2 | 11/2015 | Hoffmann et al. |
| 9,521,847 | B2 | 12/2016 | Satchivi et al. |
| 9,611,282 | B2 | 4/2017 | Eckelbarger et al. |
| 9,763,445 | B2 | 9/2017 | Satchivi et al. |
| 10,448,638 | B2 | 10/2019 | Satchivi et al. |
| 11,363,812 | B2 | 6/2022 | Wang et al. |
| 11,363,816 | B2 | 6/2022 | Kister et al. |
| 12,029,217 | B2 | 7/2024 | Satchivi et al. |
| 2003/0114311 | A1 | 6/2003 | Balko et al. |
| 2007/0093390 | A1 | 4/2007 | Witschel et al. |
| 2010/0137137 | A1 | 6/2010 | Rosinger et al. |
| 2011/0245157 | A1 | 10/2011 | Meng |
| 2015/0005156 | A1 | 1/2015 | Dash et al. |
| 2015/0005165 | A1 | 1/2015 | Hoffmann et al. |
| 2016/0073632 | A1 | 3/2016 | Satchivi et al. |
| 2016/0135457 | A1 | 5/2016 | Satchivi et al. |
| 2016/0135458 | A1 | 5/2016 | Satchivi et al. |
| 2017/0064955 | A1 | 3/2017 | Satchivi et al. |
| 2019/0069549 | A1 | 3/2019 | Satchivi et al. |
| 2019/0069550 | A1 | 3/2019 | Satchivi et al. |
| 2020/0068888 | A1 | 3/2020 | Kister et al. |
| 2021/0161135 | A1 | 6/2021 | Satchivi et al. |
| 2021/0352899 | A1 | 11/2021 | Kister et al. |
| 2021/0386068 | A1 | 12/2021 | Kister et al. |
| 2021/0392889 | A1 | 12/2021 | Kister et al. |
| 2021/0392890 | A1 | 12/2021 | Kister et al. |
| 2021/0392891 | A1 | 12/2021 | Kister et al. |
| 2021/0392892 | A1 | 12/2021 | Satchivi et al. |

(Continued)

FOREIGN PATENT DOCUMENTS

| CA | 3063094 A1 | 11/2018 |
| GB | 1565056 A | 4/1980 |

(Continued)

OTHER PUBLICATIONS

Sulfentrazone Herbicide Fact Sheet, U.S. Department of Energy, Bonneville Power Administration, pp. 1-9 (2004).*
Aim EC Herbicide label, FMC Corporation, May 2, 2017.*
Rummens, F.H.A., "An improved definition of synergistic and antagonistic effects," Weed Science, vol. 23(1), pp. 4-6 (1975).*
Richer, D.L., "Synergism—a patent view," Pesticide Science, vol. 19, pp. 309-315 (1987).*
Examination Report of Pakistan Patent Application No. 330/2018, mailed May 9, 2018, 5 Pages Applicant: (Dow Agrosciences LLC, dated Aug. 16, 2019).
Extended European Search Report for European Application No. 18798826.6, mailed Nov. 25, 2020, 8 Pages.
International Preliminary Report on Patentability for International Application No. PCT/US2018/031004, mailed Nov. 21, 2019, 7 Pages.

(Continued)

*Primary Examiner* — John Pak

(57) ABSTRACT

Disclosed herein are compositions comprising (a) a pyridine carboxylate herbicide or an agriculturally acceptable N-oxide, salt, or ester thereof and (b) a protoporphyrinogen oxidase (PROTOX) inhibitor herbicide or an agriculturally acceptable salt or ester thereof. Also disclosed herein are methods of controlling undesirable vegetation, comprising applying to vegetation or an area adjacent the vegetation or applying in soil or water to control the emergence or growth of vegetation (a) a pyridine carboxylate herbicide or an agriculturally acceptable N-oxide, salt, or ester thereof and (b) a protoporphyrinogen oxidase (PROTOX) inhibitor herbicide or an agriculturally acceptable salt or ester thereof.

15 Claims, No Drawings

(56) References Cited

U.S. PATENT DOCUMENTS

| | | |
|---|---|---|
| 2021/0400967 A1 | 12/2021 | Satchivi et al. |
| 2021/0400968 A1 | 12/2021 | Satchivi et al. |
| 2021/0400969 A1 | 12/2021 | Satchivi et al. |
| 2021/0400970 A1 | 12/2021 | Satchivi et al. |
| 2022/0000109 A1 | 1/2022 | Satchivi et al. |
| 2022/0000110 A1 | 1/2022 | Satchivi et al. |
| 2022/0007644 A1 | 1/2022 | Kister et al. |
| 2023/0009120 A1 | 1/2023 | Satchivi et al. |
| 2023/0022569 A1 | 1/2023 | Kister et al. |

FOREIGN PATENT DOCUMENTS

| | | |
|---|---|---|
| WO | 03/011853 A1 | 2/2003 |
| WO | 2009029518 A2 | 3/2009 |
| WO | 2013/014165 A1 | 1/2013 |
| WO | 2013085991 A1 | 6/2013 |
| WO | 2014018398 A1 | 1/2014 |
| WO | 2014018402 A1 | 1/2014 |
| WO | 2014018407 A1 | 1/2014 |
| WO | 2014116910 A1 | 7/2014 |
| WO | 2014116927 A1 | 7/2014 |
| WO | 2014/151005 A1 | 9/2014 |
| WO | 2016044229 A2 | 3/2016 |
| WO | 2016044276 A1 | 3/2016 |
| WO | 2016044282 A1 | 3/2016 |
| WO | 2016044283 A1 | 3/2016 |
| WO | 2016044285 A1 | 3/2016 |
| WO | 2018/208582 A1 | 11/2018 |
| WO | 2019030614 A1 | 2/2019 |
| WO | 2019046666 A1 | 3/2019 |
| WO | 2019046667 A1 | 3/2019 |
| WO | 2019060366 A1 | 3/2019 |
| WO | 2019195495 A1 | 10/2019 |
| WO | 2019195496 A1 | 10/2019 |
| WO | PCT/US2019/059606 | 4/2020 |
| WO | 2020096832 A1 | 5/2020 |

OTHER PUBLICATIONS

International Preliminary Report on Patentability for International Application No. PCT/US2019/058779, mailed May 20, 2021, 9 Pages.
International Preliminary Report on Patentability for International Application No. PCT/US2019/058788, mailed May 20, 2021, 09 Pages.
International Preliminary Report on Patentability for International Application No. PCT/US2019/058795, mailed May 20, 2021, 9 Pages.
International Preliminary Report on Patentability for International Application No. PCT/US2019/059592, mailed May 20, 2021, 9 Pages.
International Preliminary Report on Patentability for International Application No. PCT/US2019/059594, mailed May 20, 2021, 09 Pages.
International Preliminary Report on Patentability for International Application No. PCT/US2019/059596, mailed May 20, 2021,10 Pages.
International Preliminary Report on Patentability for International Application No. PCT/US2019/059599, mailed May 20, 2021,10 Pages.
International Preliminary Report on Patentability for International Application No. PCT/US2019/059601, mailed May 20, 2021,10 Pages.
International Preliminary Report on Patentability for International Application No. PCT/US2019/059604, mailed May 20, 2021, 9 Pages.
International Preliminary Report on Patentability for International Application No. PCT/US2019/059605, mailed May 20, 2021, 9 Pages.
International Preliminary Report on Patentability for International Application No. PCT/US2019/059606, mailed May 20, 2021, 9 Pages.
International Preliminary Report on Patentability for International Application No. PCT/US2019/059609, mailed May 20, 2021, 9 Pages.
International Preliminary Report on Patentability for International Application No. PCT/US2019/059612, mailed May 20, 2021, 9 Pages.
International Preliminary Report on Patentability for International Application No. PCT/US2019/059613, mailed May 20, 2021, 9 Pages.
International Preliminary Report on Patentability for International Application No. PCT/US2019/059615, mailed May 20, 2021, 10 Pages.
International Preliminary Report on Patentability for International Application No. PCT/US2019/059617, mailed May 20, 2021, 9 Pages.
International Search Report and Written Opinion for International Application No. PCT/US2014/024745, mailed Jul. 7, 2014, 9 Pages.
International Search Report and Written Opinion for International Application No. PCT/US2018/031004, mailed Jul. 26, 2018, 8 Pages.
International Search Report and Written Opinion for International Application No. PCT/US2019/058779, mailed Feb. 19, 2020, 11 Pages.
International Search Report and Written Opinion for International Application No. PCT/US2019/058788, mailed Feb. 19, 2020, 11 Pages.
International Search Report and Written Opinion for International Application No. PCT/US2019/058795, mailed Feb. 19, 2020, 11 Pages.
International Search Report and Written Opinion for International Application No. PCT/US2019/059592, mailed Apr. 2, 2020, 12 Pages.
International Search Report and Written Opinion for International Application No. PCT/US2019/059594, mailed Mar. 30, 2020, 12 Pages.
International Search Report and Written Opinion for International Application No. PCT/US2019/059596, mailed Apr. 2, 2020, 13 Pages.
International Search Report and Written Opinion for International Application No. PCT/US2019/059599, mailed Mar. 19, 2020, 13 Pages.
International Search Report and Written Opinion for International Application No. PCT/US2019/059601, mailed Apr. 2, 2020, 13 Pages.
International Search Report and Written Opinion for International Application No. PCT/US2019/059604, mailed Apr. 2, 2020, 12 Pages.
International Search Report and Written Opinion for International Application No. PCT/US2019/059605, mailed Mar. 19, 2020, 12 Pages.
International Search Report and Written Opinion for International Application No. PCT/US2019/059609, mailed Apr. 2, 2020, 12 Pages.
International Search Report and Written Opinion for International Application No. PCT/US2019/059612, mailed Mar. 19, 2020, 12 Pages.
International Search Report and Written Opinion for International Application No. PCT/US2019/059613, mailed Mar. 9, 2020, 12 Pages.
International Search Report and Written Opinion for International Application No. PCT/US2019/059615, mailed Apr. 24, 2020, 13 Pages.
International Search Report and Written Opinion for International Application No. PCT/US2019/059617, mailed Apr. 2, 2020, 12 Pages.
Official Action for Eurasian Patent Application No. 201992666, dated Nov. 23, 2021 for Dow Agrosciences LLC, Dec. 9, 2019, 3 Pages.
Official Action for Eurasian Patent Application No. 201992666, dated Feb. 24, 2021 for Dow Agrosciences LLC, Dec. 9, 2019, 3 Pages.

(56) References Cited

OTHER PUBLICATIONS

Van-Assche C. J., et al., "Photosystem li Inhibiting Chemicals: Molecular Interaction Between Inhibitors and a Common Target," Biochemical Responses Induced by Herbicides, ACS Publications, 1982, pp. 1-21.

Bayer., "An Integrated Approach to Manage Weeds," Crop Science, Retrieved from Internet URL: , No Pagination, 2016, pp. 1-3.

Official Action for Eurasian Patent Application No. 201992666, dated Feb. 17, 2021 for Dow Agrosciences LLC, English Translation Received Feb. 24, 2021, 6 Pages.

Official Action for Eurasian Patent Application No. 210992666, dated Nov. 9, 2021 for Dow AgroSciences LLC, English Translation Received Nov. 23, 2021, 5 Pages.

Colby, S.R., "Calculating Synergistic and Antagonistic Responses of Herbicide Combinations", Weeds, 1967, vol. 15, No. 1, 20-22.

\* cited by examiner

COMPOSITIONS COMPRISING A PYRIDINE CARBOXYLATE HERBICIDE AND PROTOPORPHYRINOGEN OXIDASE (PROTOX) INHIBITOR HERBICIDES

CROSS REFERENCE TO RELATED APPLICATION

This application is the National Stage Entry of International Application No. PCT/US19/59606, filed on Nov. 4, 2019, which claims the benefit of priority of U.S. Provisional Application No. 62/756,703, filed Nov. 7, 2018, both of which are incorporated by reference herein in their entirety.

FIELD

The present disclosure includes compositions comprising (a) a pyridine carboxylate herbicide or an agriculturally acceptable N-oxide, salt, or ester thereof, and (b) a protoporphyrinogen oxidase (PROTOX) inhibitor herbicide or an agriculturally acceptable salt or ester thereof. The present disclosure also includes methods of controlling undesirable vegetation using the same.

BACKGROUND

Many recurring problems in agriculture involve controlling the growth of undesirable vegetation that can, for instance, negatively affect the growth of desirable vegetation. To help control undesirable vegetation, researchers have produced a variety of chemicals and chemical formulations effective in controlling such unwanted growth. However, there exists a need for new herbicide compositions and methods to control the growth of undesirable vegetation in desired crops.

SUMMARY

Disclosed herein are compositions that may be used as herbicides, for example, in crops. The compositions may contain (a) a pyridine carboxylate herbicide or agriculturally acceptable N-oxide, salt, or ester thereof and (b) a protoporphyrinogen oxidase (PROTOX) inhibitor herbicide or an agriculturally acceptable salt or ester thereof. The weight ratio of (a) to (b) can be from 1:2000 to 600:1 (e.g., from 1:1000 to 600:1, from 1:500 to 500:1, from 1:250 to 250:1, from 1:100 to 60:1, from 1:50 to 25:1, from 1:20 to 5:1, or from 1:10 to 2:1).

In some aspects, the composition comprises (a) a pyridine carboxylate herbicide defined by Formula (I):

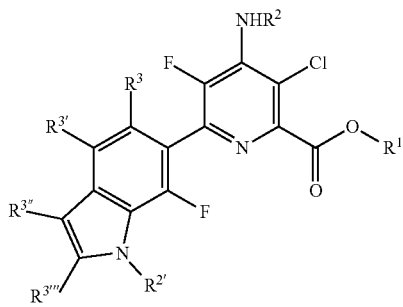

Formula I wherein:
$R^1$ is cyanomethyl or propargyl;
$R^2$ and $R^{2'}$ are independently hydrogen, $C_1$-$C_6$ alkyl, formyl, alkoxycarbonyl, or acyl;
$R^3$, $R^{3'}$, $R^{3''}$, and $R^{3'''}$ are independently hydrogen, halogen, $C_1$-$C_4$ alkyl, $C_1$-$C_4$ haloalkyl, $C_1$-$C_3$ alkoxy, or $C_1$-$C_3$ haloalkoxy;
or an agriculturally acceptable N-oxide, salt, or ester thereof and
(b) a protoporphyrinogen oxidase (PROTOX) inhibitor herbicide or an agriculturally acceptable salt or ester thereof.

In some aspects, the composition comprises:
(a) the pyridine carboxylate herbicide compound cyanomethyl 4-amino-3-chloro-5-fluoro-6-(7-fluoro-1H-indol-6-yl)pyridine-2-carboxylate, referred to hereinafter as Compound A:

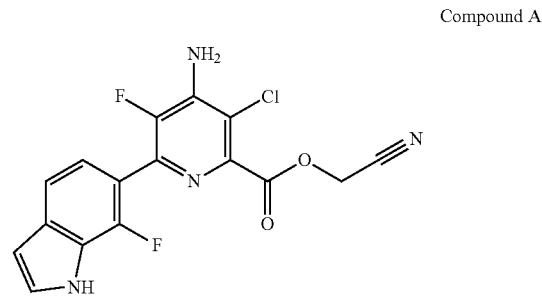 [SMILES: N#CCOC(=O)c1nc(-c2ccc3cc[nH]c3c2F)c(F)c(N)c1Cl]

Compound A or an agriculturally acceptable N-oxide, salt, or ester thereof and
(b) a protoporphyrinogen oxidase (PROTOX) inhibitor herbicide or an agriculturally acceptable salt or ester thereof.

In some aspects, the composition comprises:
(a) the pyridine carboxylate herbicide compound propargyl 4-amino-3-chloro-5-fluoro-6-(7-fluoro-1H-indol-6-yl)pyridine-2-carboxylate, referred to hereinafter as Compound B:

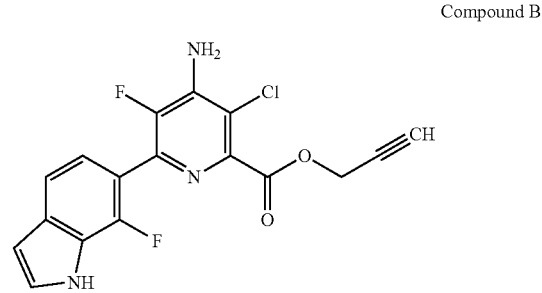 [SMILES: C#CCOC(=O)c1nc(-c2ccc3cc[nH]c3c2F)c(F)c(N)c1Cl]

Compound B or an agriculturally acceptable N-oxide, salt, or ester thereof; and
(b) a protoporphyrinogen oxidase (PROTOX) inhibitor herbicide or an agriculturally acceptable salt or ester thereof.

In some aspects, (b) can comprise a PROTOX inhibitor herbicide. In some aspects, (b) can include acifluorfen, azafenidin, benzfendizone, bifenox, butafenacil, carfentrazone, chlomethoxyfen, cinidon, fluazolate, flufenpyr, flumiclorac, flumioxazin, fluoroglycofen, fluthiacet, fomesafen, halosafen, lactofen, oxadiargyl, oxadiazon, oxyfluorfen, pentoxazone, profluazol, pyraclonil, pyraflufen, saflufenacil, sulfentrazone, thidiazimin, tiafenacil, agriculturally acceptable salts or esters thereof, agriculturally acceptable esters thereof, or combinations thereof.

In some aspects, the composition can further comprise an agriculturally acceptable adjuvant or carrier, a herbicidal safener, an additional pesticide, or combinations thereof. In some aspects, the only active ingredients in the composition are (a) and (b). In some aspects, the composition can be provided as a herbicidal concentrate.

Also disclosed herein are methods of controlling undesirable vegetation, comprising applying to vegetation, to an area adjacent the vegetation, or to soil or water to control the emergence or growth of vegetation, a composition comprising: (a) a pyridine carboxylate herbicide or an agriculturally acceptable N-oxide, salt, or ester thereof; and (b) a protoporphyrinogen oxidase (PROTOX) inhibitor herbicide or an agriculturally acceptable salt or ester thereof. In some aspects, (a) and (b) are applied simultaneously. In some aspects, (a) and (b) are applied sequentially. In some aspects, (a) and (b) are applied pre-emergence of the undesirable vegetation. In some aspects, (a) and (b) are applied post-emergence of the undesirable vegetation. In some aspects, the undesirable vegetation is in cereals. In some aspects, the undesirable vegetation is in maize, wheat, barley, rice, sorghum, millet, or oats. In some aspects, the undesirable vegetation is in broadleaf crops. In some aspects, the undesirable vegetation is in canola, flax, sunflower, soy, or cotton.

In some aspects, the pyridine carboxylate herbicide (a) can be applied in an amount of from 0.5 gram acid equivalent per hectare (g ae/ha) to 300 g ae/ha (e.g., from 30 g ae/ha to 40 g ae/ha). In some aspects, the PROTOX inhibitor herbicide (b) can be applied in an amount of from 0.5 gram active ingredient per hectare (g ai/ha) to 1000 g ai/ha (e.g., from 5 g ai/ha to 250 g ai/ha). In some cases, (a) and (b) can be applied in a weight ratio of from 1:2000 to 600:1 (e.g., from 1:1500 to 600:1, from 1:500 to 500:1, from 1:250 to 250:1, from 1:100 to 60:1, from 1:50 to 25:1, from 1:20 to 5:1, or from 1:10 to 2:1).

The description below sets forth details of one or more aspect of the present disclosure. Other features, objects, and advantages will be apparent from the description and from the claims.

DETAILED DESCRIPTION

The present disclosure includes compositions comprising: (a) a pyridine carboxylate herbicide or an agriculturally acceptable N-oxide, salt, or ester thereof and (b) a protoporphyrinogen oxidase (PROTOX) inhibitor herbicide or an agriculturally acceptable salt or ester thereof. The present disclosure also includes methods for controlling undesirable vegetation. In some aspects, the undesirable vegetation is in cereals. In some aspects, the undesirable vegetation is in maize, wheat, barley, rice, sorghum, millet, or oats. In some aspects, the undesirable vegetation is in broadleaf crops. In some aspects, the undesirable vegetation is in canola, flax, sunflower, soy, or cotton.

I. Definitions

Terms used herein will have their customary meaning in the art unless specified otherwise. The singular forms "a" and "the" include plural references unless stated otherwise. To the extent that the term "or" is employed (e.g., A or B) it is intended to mean "A or B or both." If this disclosure intends to indicate "only A or B but not both" then the term "only A or B but not both" will be employed. Thus, use of the term "or" herein is the inclusive and not the exclusive use.

The chemical moieties mentioned when defining variable positions within the general formulae described herein (e.g., the term "alkyl") are collective terms for the individual substituents encompassed by the chemical moiety. The prefix $C_n$-$C_m$ preceding a group or moiety indicates, in each case, the possible number of carbon atoms in the group or moiety that follows.

As used herein, the terms "herbicide" and "herbicidal active ingredient" may be understood to include an active ingredient that kills, controls, or otherwise adversely modifies the growth of vegetation, particularly undesirable vegetation such as weed species, when applied in an appropriate amount.

As used herein, the term "herbicidal effect" may be understood to include an adversely modifying effect of an active ingredient on vegetation, including, for example, a deviation from natural growth or development, killing, regulation, desiccation, growth inhibition, growth reduction, and retardation. The term "herbicidal activity" refers generally to herbicidal effects of an active ingredient. As used herein, the term "prevents" or similar terms such as "preventing" may be understood by a person of ordinary skill to include any combination that shows herbicidal effect or reduces the competitive capability of the weed with respect to a crop.

As used herein, "applying" a herbicide or herbicidal composition refers to delivering it directly to the targeted vegetation or to the locus thereof or to the area where control of undesirable vegetation is desired. Methods of application include, but are not limited to, pre-emergently contacting soil or water, post-emergently contacting the undesirable vegetation, or contacting the area adjacent to the undesirable vegetation.

As used herein, the term "vegetation" can include, for instance, dormant seeds, germinating seeds, emerging seedlings, plants propagating from vegetative propagules, immature vegetation, and established vegetation.

As used herein, the term "crop" refers to desired vegetation, for instance, plants that are grown to provide food, shelter, pasture, erosion control, etc. Example crops include cereals, legumes, vegetables, orchard and timber trees, grapevines, etc. Preferably, herbicides or herbicidal compositions have zero or minimal herbicidal effect on crops.

As used herein, the term "undesirable vegetation" refers to vegetation that is not wanted in a given area, for instance, weed species. Herbicides or compositions are used to control undesirable vegetation. Preferably, herbicides or herbicidal compositions have a large or complete herbicidal effect on undesirable vegetation.

As used herein, "active ingredient" or "ai" may be understood to include a chemical compound or composition that has an effect on vegetation, for example, a herbicidal effect or a safening effect on the vegetation.

As used herein, "acid equivalent" or "ae" may be understood to include the amount of the acid form of an active ingredient that is calculated from the amount of a salt or ester form of that active ingredient. For example, if the acid form of an active ingredient "Z" has a molecular weight of 100 Dalton, and the salt form of Z has a molecular weight of 130 Dalton, an application of 130 g ai/ha of the Z salt would be equal to applying 100 g ae/ha of the acid form of Z:

$$130 \text{ g ai/ha } Z \text{ salt} * (100 \text{ Da } Z \text{ acid}/130 \text{ Da } Z \text{ salt}) = 100 \text{ g ae/ha } Z \text{ acid.}$$

As used herein, unless otherwise specified, the term "acyl" may be understood to include a group of formula —C(O)R, where "C(O)" is short-hand notation for C=O. In the acyl group, the R may be alkyl (e.g., $C_1$-$C_6$ alkyl), haloalkyl (e.g., $C_1$-$C_6$ haloalkyl), alkenyl (e.g., $C_2$-$C_6$ alkenyl), haloalkenyl (e.g., $C_2$-$C_6$ haloalkenyl), alkynyl (e.g., $C_2$-$C_6$ alkynyl), aryl or heteroaryl, or arylalkyl (e.g., $C_7$-$C_{10}$ arylalkyl).

As used herein, the term "alkyl" may be understood to include straight-chained, branched, or cyclic saturated hydrocarbon moieties. Unless otherwise specified, $C_1$-$C_{20}$ (e.g., $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, cyclopropyl, 1-methyl-ethyl, butyl, cyclobutyl, 1-methyl-propyl, 2-methyl-propyl, 1,1-dimethyl-ethyl, pentyl, cyclopentyl, 1-methyl-butyl, 2-methyl-butyl, 3-methyl-butyl, 2,2-dimethyl-propyl, 1-ethyl-propyl, hexyl, cyclohexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, and 1-ethyl-2-methyl-propyl. Alkyl substituents may also be substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied. Preferred substituents include cyano and $C_1$-$C_6$ alkoxy.

As used herein, the term "haloalkyl" may be understood to include alkyl groups wherein the hydrogen atoms may partially or entirely be substituted with halogen atoms. Unless otherwise specified, $C_1$-$C_{20}$ (e.g., $C_1$-$C_{12}$, $C_1$-$C_{10}$, $C_1$-$C_8$, $C_1$-$C_6$, or $C_1$-$C_4$) alkyl groups are intended. Examples include chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl, pentafluoroethyl, and 1,1,1-trifluoroprop-2-yl. Haloalkyl substituents may also be substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied. Preferred substituents include cyano and $C_1$-$C_6$ alkoxy.

As used herein, the term "alkoxy" may be understood to include a group of the formula R—O—, where R is unsubstituted or substituted alkyl as defined above. Unless otherwise specified, alkoxy groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-dimethyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

As used herein, the term "alkoxycarbonyl" may be understood to include a group of the formula —C(O)OR, where R is an unsubstituted or substituted alkyl as defined above. Unless otherwise specified, alkoxycarbonyl groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include methoxycarbonyl, ethoxycarbonyl, propoxycarbonyl, 1-methyl-ethoxycarbonyl, butoxycarbonyl, 1-methyl-propoxycarbonyl, 2-methyl-propoxycarbonyl, 1,1-dimethyl-ethoxycarbonyl, pentoxycarbonyl, 1-methyl-butoxycarbonyl, 2-methyl-butoxycarbonyl, 3-methyl-butoxycarbonyl, 2,2-dimethyl-propoxycarbonyl, 1-ethyl-propoxycarbonyl, hexoxycarbonyl, 1,1-dimethyl-propoxycarbonyl, 1,2-dimethyl-propoxycarbonyl, 1-methyl-pentoxycarbonyl, 2-methyl-pentoxycarbonyl, 3-methyl-pentoxycarbonyl, 4-methyl-penoxycarbonyl, 1,1-dimethyl-butoxycarbonyl, 1,2-dimethyl-butoxycarbonyl, 1,3-dimethyl-butoxycarbonyl, 2,2-dimethyl-butoxycarbonyl, 2,3-dimethyl-butoxycarbonyl, 3,3-dimethyl-butoxycarbonyl, 1-ethyl-butoxycarbonyl, 2-ethylbutoxycarbonyl, 1,1,2-trimethyl-propoxycarbonyl, 1,2,2-trimethyl-propoxycarbonyl, 1-ethyl-1-methyl-propoxycarbonyl, and 1-ethyl-2-methyl-propoxycarbonyl.

As used herein, the term "haloalkoxy" may be understood to include a group of the formula R—O—, where R is unsubstituted or substituted haloalkyl as defined above. Unless otherwise specified, haloalkoxy groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include chloromethoxy, bromomethoxy, dichloromethoxy, trichloromethoxy, fluoromethoxy, difluoromethoxy, trifluoromethoxy, chlorofluoromethoxy, dichlorofluoromethoxy, chlorodifluoromethoxy, 1-chloroethoxy, 1-bromoethoxy, 1-fluoroethoxy, 2-fluoroethoxy, 2,2-difluoroethoxy, 2,2,2-trifluoroethoxy, 2-chloro-2-fluoroethoxy, 2-chloro-2,2-difluoroethoxy, 2,2-dichloro-2-fluoroethoxy, 2,2,2-trichloroethoxy, pentafluoroethoxy, and 1,1,1-trifluoroprop-2-oxy.

As used herein, the term "aryl," as well as derivative terms such as aryloxy, may be understood to include groups that include a monovalent aromatic carbocyclic group of from 6 to 14 carbon atoms. Aryl groups can include a single ring or multiple condensed rings. In some aspects, aryl groups include $C_6$-$C_{10}$ aryl groups. Examples of aryl groups include, but are not limited to, phenyl, biphenyl, naphthyl, tetrahydronaphthyl, phenylcyclopropyl, and indanyl. In some aspects, the aryl group can be a phenyl, indanyl or naphthyl group.

As used herein, the term "heteroaryl," as well as derivative terms such as "heteroaryloxy," may be understood to include a 5- or 6-membered aromatic ring containing one or more heteroatoms, for example, N, O or S. Heteroaryl rings may be fused to other aromatic systems. The aryl or heteroaryl substituents may also be substituted with one or more chemical moieties. Examples of suitable substituents include, for example, hydroxy, nitro, cyano, formyl, $C_1$-$C_6$ alkyl, $C_2$-$C_6$ alkenyl, $C_2$-$C_6$ alkynyl, $C_1$-$C_6$ alkoxy, $C_1$-$C_6$ haloalkyl, $C_1$-$C_6$ haloalkoxy, $C_1$-$C_6$ acyl, $C_1$-$C_6$ alkylthio, $C_1$-$C_6$ alkylsulfinyl, $C_1$-$C_6$ alkylsulfonyl, $C_1$-$C_6$ alkoxycarbonyl, $C_1$-$C_6$ carbamoyl, hydroxycarbonyl, $C_1$-$C_6$ alkylcarbonyl, aminocarbonyl, $C_1$-$C_6$ alkylaminocarbonyl, $C_1$-$C_6$ dialkylaminocarbonyl, provided that the substituents are sterically compatible and the rules of chemical bonding and strain energy are satisfied. Preferred substituents include halogen, C alkyl and C haloalkyl.

As used herein, the term "halogen," including derivative terms such as "halo," refers to fluorine, chlorine, bromine and iodine.

As used herein, agriculturally acceptable salts and esters may be understood to include salts and esters that exhibit herbicidal activity, or that are or can be converted in plants, water, or soil to the referenced herbicide. Exemplary agriculturally acceptable esters are those that are or can be hydrolyzed, oxidized, metabolized, or otherwise converted, e.g., in plants, water, or soil, to the corresponding carboxylic acid which, depending on the pH, may be in the dissociated or undissociated form.

Compounds described herein can include N-oxides. Pyridine N-oxides can be obtained by oxidation of the corresponding pyridines. Suitable oxidation methods are described, for example, in Houben-Weyl, Methoden der organischen Chemie [Methods in organic chemistry], expanded and subsequent volumes to the 4th edition, volume E 7b, p. 565 f.

II. Pyridine carboxylate Herbicides

Compositions and methods of the present disclosure include a composition comprising
(a) a pyridine carboxylate herbicide defined by Formula (I):

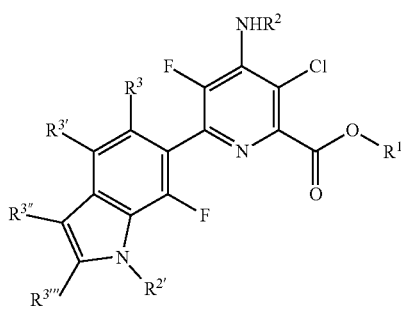

Formula I wherein:
R$^1$ is cyanomethyl or propargyl;
R$^2$ and R$^{2'}$ are independently hydrogen, $C_1$-$C_6$ alkyl, formyl, alkoxycarbonyl, or acyl;
R$^3$, R$^{3'}$, R$^{3''}$, and R$^{3'''}$ are independently hydrogen, halogen, $C_1$-$C_4$ alkyl, $C_1$-$C_4$ haloalkyl, $C_1$-$C_3$ alkoxy, or $C_1$-$C_3$ haloalkoxy;
or an agriculturally acceptable N-oxide, salt, or ester thereof; and
(b) a protoporphyrinogen oxidase (PROTOX) inhibitor herbicide or an agriculturally acceptable salt or ester thereof.

In some aspects, compositions and methods of the present disclosure include the composition comprising (a) the pyridine carboxylate herbicide cyanomethyl 4-amino-3-chloro-5-fluoro-6-(7-fluoro-1H-indol-6-yl)pyridine-2-carboxylate, Compound A:

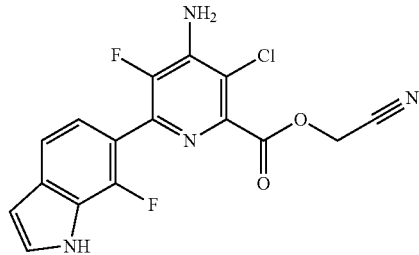

Compound A or an agriculturally acceptable N-oxide, salt, or ester thereof, and (b) a protoporphyrinogen oxidase (PROTOX) inhibitor herbicide or an agriculturally acceptable salt or ester thereof.

In some aspects, compositions and methods of the present disclosure include the composition comprising (a) the pyridine carboxylate herbicide propargyl 4-amino-3-chloro-5-fluoro-6-(7-fluoro-1H-indol-6-yl)pyridine-2-carboxylate, Compound B:

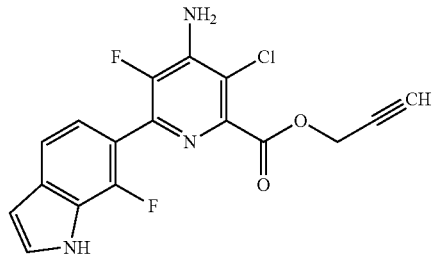

Compound B or an agriculturally acceptable N-oxide, salt, or ester thereof, and (b) a protoporphyrinogen oxidase (PROTOX) inhibitor herbicide or an agriculturally acceptable salt or ester thereof.

Pyridine carboxylate herbicides defined by Formula (I), as well as methods of making these pyridine carboxylate herbicides, are disclosed in application PCT/US2018/031004, filed May 4, 2018, the entire disclosure of which is hereby expressly incorporated by reference.

In some aspects, the pyridine carboxylate herbicide can be provided as an agriculturally acceptable salt. Exemplary agriculturally acceptable salts of the pyridine carboxylate herbicides include, but are not limited to: sodium salts; potassium salts; ammonium salts or substituted ammonium salts, in particular mono-, di- and tri-$C_1$-$C_8$-alkylammonium salts such as methyl ammonium, dimethylammonium and isopropylammonium; mono-, di- and tri-hydroxy-$C_2$-$C_8$-alkylammonium salts such as hydroxyethylammonium, di(hydroxyethyl)ammonium, tri(hydroxyethyl)ammonium, hydroxypropylammonium, di(hydroxypropyl)ammonium and tri(hydroxypropyl)ammonium salts; olamine salts; diglycolamine salts; choline salts; and quaternary ammonium salts such as those represented by the formula R$^9$R$^{10}$R$^{11}$R$^{12}$N$^+$ and wherein R$^9$, R$^{10}$, R$^{11}$ and R$^{12}$ (e.g., R$^9$-R$^{12}$) each independently can represent hydrogen, $C_1$-$C_{10}$ alkyl, $C_2$-$C_8$ alkenyl, $C_2$-$C_8$ alkynyl, $C_1$-$C_8$ alkoxy, $C_1$-$C_8$ alkylthio, or aryl groups, provided that R$^9$-R$^{12}$ are sterically compatible.

In some aspects, the pyridine carboxylate herbicide can be provided as an agriculturally acceptable ester. Exemplary agriculturally acceptable esters of the pyridine carboxylate herbicides include, but are not limited to: methyl, ethyl, propyl, 1-methyl-ethyl, butyl, 1-methyl-propyl, 2-methyl-propyl, pentyl, 1-methyl-butyl, 2-methyl-butyl, 3-methyl-butyl, 1-ethyl-propyl, hexyl, 1-methyl-hexyl (mexyl), 2-ethylhexyl, heptyl, 1-methyl-heptyl (meptyl), octyl, isooctyl (isoctyl), butoxyethyl (butotyl), and benzyl.

The pyridine carboxylate herbicide, or an agriculturally acceptable N-oxide, salt, or ester thereof, can be applied to vegetation or an area adjacent the vegetation or applied to soil or water to prevent the emergence or growth of vegetation in an amount sufficient to induce a herbicidal effect. In some aspects, the pyridine carboxylate herbicide, or an agriculturally acceptable N-oxide, salt, or ester thereof, is applied to vegetation or an area adjacent the vegetation or applied to soil or water to prevent the emergence or growth of vegetation in an amount of 0.1 grams acid equivalent per hectare (g ae/ha) or greater, such as 0.2 g ae/ha or greater, 0.3 g ae/ha or greater, 0.4 g ae/ha or greater, 0.5 g ae/ha or greater, 0.6 g ae/ha or greater, 0.7 g ae/ha or greater, 0.8 g ae/ha or greater, 0.9 g ae/ha or greater, 1 g ae/ha or greater, 1.1 g ae/ha or greater, 1.2 g ae/ha or greater, 1.3 g ae/ha or greater, 1.4 g ae/ha or greater, 1.5 g ae/ha or greater, 1.6 g ae/ha or greater, 1.7 g ae/ha or greater, 1.8 g ae/ha or greater, 1.9 g ae/ha or greater, 2 g ae/ha or greater, 2.25 g ae/ha or greater, 2.5 g ae/ha or greater, 2.75 g ae/ha or greater, 3 g ae/ha or greater, 4 g ae/ha or greater, 5 g ae/ha or greater, 6 g ae/ha or greater, 7 g ae/ha or greater, 8 g ae/ha or greater, 9 g ae/ha or greater, 10 g ae/ha or greater, 11 g ae/ha or greater, 12 g ae/ha or greater, 13 g ae/ha or greater, 14 g ae/ha or greater, 15 g ae/ha or greater, 16 g ae/ha or greater, 17 g ae/ha or greater, 18 g ae/ha or greater, 19 g ae/ha or greater, 20 g ae/ha or greater, 22 g ae/ha or greater, 24 g ae/ha or greater, 25 g ae/ha or greater, 26 g ae/ha or greater, 28 g ae/ha or greater, 30 g ae/ha or greater, 32 g ae/ha or greater, 34 g ae/ha or greater, 35 g ae/ha or greater, 36 g ae/ha or greater, 38 g ae/ha or greater, 40 g ae/ha or greater, 42.5 g ae/ha or greater, 45 g ae/ha or greater, 47.5 g ae/ha or greater, 50 g ae/ha or greater, 52.5 g ae/ha or greater, 55 g ae/ha or greater, 57.5 g ae/ha or greater, 60 g ae/ha or greater, 65 g ae/ha or greater, 70 g ae/ha or greater, 75 g ae/ha or greater, 80 g ae/ha or greater, 85 g ae/ha or greater, 90 g ae/ha or greater, 95 g ae/ha or greater, 100 g ae/ha or greater, 110 g ae/ha or greater, 120 g ae/ha or greater, 130 g ae/ha or greater, 140 g ae/ha or greater, 150 g ae/ha or greater, 160 g ae/ha or greater, 170 g ae/ha or greater, 180 g ae/ha or greater, 190 g ae/ha or greater, 200 g ae/ha or greater, 210 g ae/ha or greater, 220 g ae/ha or greater, 230 g ae/ha or greater, 240 g ae/ha or greater, 250 g ae/ha or greater, 260 g ae/ha or greater, 270 g ae/ha or greater, 280 g ae/ha or greater, or 290 g ae/ha or greater; in an amount of 300 g ae/ha or less, such as 290 g ae/ha or less, 280 g ae/ha or less, 270 g ae/ha or less, 260 g ae/ha or less, 250 g ae/ha or less, 240 g ae/ha or less, 230 g ae/ha or less, 220 g ae/ha or less, 210 g ae/ha or less, 200 g ae/ha or less, 190 g ae/ha or less, 180 g ae/ha or less, 170 g ae/ha or less, 160 g ae/ha or less, 150 g ae/ha or less, 140 g ae/ha or less, 130 g ae/ha or less, 120 g ae/ha or less, 110 g ae/ha or less, 100 g ae/ha or less, 95 g ae/ha or less, 90 g ae/ha or less, 85 g ae/ha or less, 80 g ae/ha or less, 75 g ae/ha or less, 70 g ae/ha or less, 65 g ae/ha or less, 60 g ae/ha or less, 57.5 g ae/ha or less, 55 g ae/ha or less, 52.5 g ae/ha or less, 50 g ae/ha or less, 47.5 g ae/ha or less, 45 g ae/ha or less, 42.5 g ae/ha or less, 40 g ae/ha or less, 38 g ae/ha or less, 36 g ae/ha or less, 35 g ae/ha or less, 34 g ae/ha or less, 32 g ae/ha or less, 30 g ae/ha or less, 28 g ae/ha or less, 26 g ae/ha or less, 25 g ae/ha or less, 24 g ae/ha or less, 22 g ae/ha or less, 20 g ae/ha or less, 19 g ae/ha or less, 18 g ae/ha or less, 17 g ae/ha or less, 16 g ae/ha or less, 15 g ae/ha or less, 14 g ae/ha or less, 13 g ae/ha or less, 12 g ae/ha or less, 11 g ae/ha or less, 10 g ae/ha or less, 9 g ae/ha or less, 8 g ae/ha or less, 7 g ae/ha or less, 6 g ae/ha or less, 5 g ae/ha or less, 4 g ae/ha or less, 3 g ae/ha or less, 2.75 g ae/ha or less, 2.5 g ae/ha or less, 2.25 g ae/ha or less, 2 g ae/ha or less, 1.9 g ae/ha or less, 1.8 g ae/ha or less, 1.7 g ae/ha or less, 1.6 g ae/ha or less, 1.5 g ae/ha or less, 1.4 g ae/ha or less, 1.3 g ae/ha or less, 1.2 g ae/ha or less, 1.1 g ae/ha or less, 1 g ae/ha or less, 0.9 g ae/ha or less, 0.8 g ae/ha or less, 0.7 g ae/ha or less, 0.6 g ae/ha or less, 0.5 g ae/ha or less, 0.4 g ae/ha or less, 0.3 g ae/ha or less, or 0.2 g ae/ha or less; or in an amount within any range defined between any pair of the preceding values, such as 0.1-300 g ae/ha, 1-150 g ae/ha, 10-200 g ae/ha, 25 g ae/ha-75 g ae/ha, or 40-100 g ae/ha.

III. PROTOX Inhibitor Herbicides

In addition to the pyridine carboxylate herbicide of Formula (I), or agriculturally acceptable N-oxide, salt, or ester thereof, the compositions can include an inhibitor of a protoporphyrinogen oxidase (PROTOX), which is an enzyme involved in the biosynthesis of both heme and chlorophyll. It is believed that PROTOX inhibitors generate large amounts of singlet oxygen, which leads to the peroxidation of the lipids in cell membranes. Examples of PROTOX inhibitors include acifluorfen, azafenidin, benzfendizone, bifenox, butafenacil, carfentrazone, chlomethoxyfen, cinidon, fluazolate, flufenpyr, flumiclorac, flumioxazin, fluoroglycofen, fluthiacet, fomesafen, halosafen, lactofen, oxadiargyl, oxadiazon, oxyfluorfen, pentoxazone, profluazol, pyraclonil, pyraflufen, saflufenacil, sulfentrazone, thidiazimin, tiafenacil, agriculturally acceptable salts thereof, agriculturally acceptable esters thereof, or combinations thereof.

In some aspects the PROTOX inhibitor may include at least one of acifluorfen, acifluorfen-sodium, azafenidin, bencarbazone, benzfendizone, bifenox, butafenacil, carfentrazone, carfentrazone-ethyl, chlomethoxyfen, cinidon-ethyl, fluazolate, flufenpyr, flufenpyr-ethyl, flumiclorac, flumiclorac-pentyl, flumioxazin, fluoroglycofen, fluoroglycofen-ethyl, fluthiacet, fluthiacet-methyl, fomesafen, halosafen, lactofen, oxadiargyl, oxadiazon, oxyfluorfen, pentoxazone, profluazol, pyraclonil, pyraflufen, pyraflufen-ethyl, saflufenacil, sulfentrazone, thidiazimin, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate (CAS 353292-31-6; S-3100), N-ethyl-3-(2,6-dichloro-4-trifluoromethylphenoxy)-5-methyl-1H-pyrazole-1-carboxamide (CAS 452098-92-9), N-tetrahydrofurfuryl-3-(2,6-dichloro-4-trifluoromethylphenoxy)-5-methyl-1-H-pyrazole-1-carboxamide (CAS 915396-43-9), N-ethyl-3-(2-chloro-6-fluoro-4-trifluoromethylphenoxy)-5-methyl-1H-pyrazo-le-1-carboxamide (CAS 452099-05-7), N-tetrahydrofurfuryl-3-(2-chloro-6-fluoro-4-trifluoromethylphenoxy)-5-methyl-1H-pyrazole-1-carboxamide (CAS 45100-03-7), 3-[7-fluoro-3-oxo-4-(prop-2-ynyl)-3,4-dihydro-2H-benzo[1,4]oxazin-6-yl]-1,5-dimethyl-6-thioxo[1,3,5]triazinan-2,4-dione, agriculturally acceptable salts thereof, agriculturally acceptable esters thereof, or combinations thereof.

The PROTOX inhibitor or agriculturally acceptable salt or ester thereof can be applied to vegetation or an area adjacent to the vegetation or applied to soil or water to prevent the emergence or growth of vegetation in an amount sufficient to induce a herbicidal effect. In some aspects, the PROTOX inhibitor or agriculturally acceptable salt or ester thereof is applied to vegetation or an area adjacent the vegetation or applied to soil or water to prevent the emergence or growth of vegetation in an amount of 0.5 grams active ingredient per hectare (g ai/ha) or more, such as 1 g ai/ha or more, 1.25 g ai/ha or more, 1.5 g ai/ha or more, 1.75 g ai/ha or more, 2 g ai/ha or more, 2.5 g ai/ha or more, 3 g ai/ha or more, 3.5 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 21 g ai/ha or more, 22 g ai/ha or more, 23 g ai/ha or more, 24 g ai/ha or more, 25 g ai/ha or more, 26 g ai/ha or more, 27 g ai/ha or more, 28 g ai/ha or more, 29 g ai/ha or more, 30 g ai/ha or more, 31 g ai/ha or more, 32 g ai/ha or more, 33 g ai/ha or more, 34 g ai/ha or more, 35 g ai/ha or more, 36 g ai/ha or more, 37 g ai/ha or more, 38 g ai/ha or more, 39 g ai/ha or more, 40 g ai/ha or more, 41 g ai/ha or more, 42 g ai/ha or more, 43 g ai/ha or more, 44 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 220 g ai/ha or more, 240 g ai/ha or more, 250 g ai/ha or more, 260 g ai/ha or more, 280 g ai/ha or more, 300 g ai/ha or more, 320 g ai/ha or more, 340 g ai/ha or more, 350 g ai/ha or more, 360 g ai/ha or more, 380 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, or 975 g ai/ha or more; in an amount of 1000 g ai/ha or less, such as 975 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 380 g ai/ha or less, 360 g ai/ha or less, 350 g ai/ha or less, 340 g ai/ha or less, 320 g ai/ha or less, 300 g ai/ha or less, 280 g ai/ha or less, 260 g ai/ha or less, 250 g ai/ha or less, 240 g ai/ha or less, 220 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 44 g ai/ha or less, 43 g ai/ha or less, 42 g ai/ha or less, 41 g ai/ha or less, 40 g ai/ha or less, 39 g ai/ha or less, 38 g ai/ha or less, 37 g ai/ha or less, 36 g ai/ha or less, 35 g ai/ha or less, 34 g ai/ha or less, 33 g ai/ha or less, 32 g ai/ha or less, 31 g ai/ha or less, 30 g ai/ha or less, 29 g ai/ha or less, 28 g ai/ha or less, 27 g ai/ha or less, 26 g ai/ha or less, 25 g ai/ha or less, 24 g ai/ha or less, 23 g ai/ha or less, 22 g ai/ha or less, 21 g ai/ha or less, 20 g ai/ha or less, 19 g ai/ha or less, 18 g ai/ha or less, 17 g ai/ha or less, 16 ai/ha or less, 15 g ai/ha or less, 14 g ai/ha or less, 13 g ai/ha or less, 12 g ai/ha or less, 11 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3.5 g ai/ha or less, 3 g ai/ha or less, 2.5 g ai/ha or less, 2 g ai/ha or less, 1.75 g ai/ha or less, 1.5 g ai/ha or less, 1.25 g ai/ha or less, or 1 g ai/ha or less; or in an amount ranging from any of the minimum values described above to any of the maximum values described above, such as 0.5-1000 g ai/ha, 2-900 g ai/ha, 1.75-300 g ai/ha, 75-550 g ai/ha, 90-900 g ai/ha, 55-400 g ai/ha, 36-250 g ai/ha, 80-650 g ai/ha, 120-360 g ai/ha, 65-170 g ai/ha, 34-700 g ai/ha, 12-200 g ai/ha, 5-220 g ai/ha, 1.5-25 g ai/ha, 70-450 g ai/ha, 39-110 g ai/ha, or 1-975 g ai/ha.

In some aspects, the herbicidal composition contains a herbicidally effective amount of (a) a pyridine carboxylate herbicide or an agriculturally acceptable N-oxide, salt, or ester thereof, and (b) acifluorfen, azafenidin, benzfendizone, bifenox, butafenacil, carfentrazone, chlomethoxyfen, cinidon, fluazolate, flufenpyr, flumiclorac, flumioxazin, fluoroglycofen, fluthiacet, fomesafen, halosafen, lactofen, oxadiargyl, oxadiazon, oxyfluorfen, pentoxazone, profluazol, pyraclonil, pyraflufen, saflufenacil, sulfentrazone, thidiazimin, tiafenacil, agriculturally acceptable salts or esters thereof, or combinations thereof.

Acifluorfen

Compositions and methods of the present disclosure can include acifluorfen or an agriculturally acceptable salt or ester thereof. Acifluorfen, as well as methods of preparing acifluorfen, are known in the art. Acifluorfen, shown below, is 5-[2-chloro-4-(trifluoromethyl)phenoxy]-2-nitrobenzoic acid. Its herbicidal activity is exemplified in Turner, J. A., Ed., *The Pesticide Manual: A World Compendium,* 17th ed.; BCPC: Alton, Hampshire, U K, 2016 (hereafter "*The Pesticide Manual*"). Exemplary uses of acifluorfen include its use for post-emergence control of broadleaf weeds, with some control of grass weeds, in soybeans, peanuts, and rice.

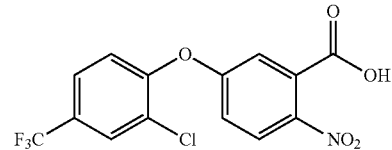 [SMILES: O=C(O)c1cc(Oc2ccc(C(F)(F)F)cc2Cl)ccc1[N+](=O)[O-]]

Acifluorfen can be applied to the foliage and roots of undesirable vegetation in an amount sufficient to induce a herbicidal effect. In some aspects, acifluorfen is applied to the foliage and roots of undesirable vegetation in an amount of 100 g ai/ha or more, such as 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 210 g ai/ha or more, 220 g ai/ha or more, 225 g ai/ha or more, 230 g ai/ha or more, 240 g ai/ha or more, 250 g ai/ha or more, 260 g ai/ha or more, 270 g ai/ha or more, 275 g ai/ha or more, 280 g ai/ha or more, 290 g ai/ha or more, 300 g ai/ha or more, 320 g ai/ha or more, 340 g ai/ha or more, 350 g ai/ha or more, 360 g ai/ha or more, 380 g ai/ha or more, 400 g ai/ha or more, 425 g ai/ha or more, 450 g ai/ha or more, 475 g ai/ha or more, 500 g ai/ha or more, 525 g ai/ha or more, 550 g ai/ha or more, 575 g ai/ha or more, 600 g ai/ha or more, 650 g ai/ha or more, or 700 g ai/ha or more; in an amount of 700 g ai/ha or less, such as 675 g ai/ha or less, 650 g ai/ha or less, 625 g ai/ha or less, 600 g ai/ha or less, 575 g ai/ha or less, 550 g ai/ha or less, 525 g ai/ha or less, 500 g ai/ha or less, 475 g ai/ha or less, 450 g ai/ha or less, 425 g ai/ha or less, 400 g ai/ha or less, 380 g ai/ha or less, 375 g ai/ha or less, 360 g ai/ha or less, 350 g ai/ha or less, 340 g ai/ha or less, 325 g ai/ha or less, 320 g ai/ha or less, 300 g ai/ha or less, 290 g ai/ha or less, 280 g ai/ha or less, 275 g ai/ha or less, 270 g ai/ha or less, 260 g ai/ha or less, 250 g ai/ha or less, 240 g ai/ha or less, 230 g ai/ha or less, 225 g ai/ha or less, 220 g ai/ha or less, 210 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, 110 g ai/ha or less, or 100 g ai/ha or less; or in an amount ranging from any of the minimum values described above to any of the maximum values described above, such as 100-700 g ai/ha, 120-700 g ai/ha, 225-700 g ai/ha, 200-600 g ai/ha, 100-525 g ai/ha, 160-340 g ai/ha, 200-425 g ai/ha, 140-250 g ai/ha, 200-340 g ai/ha, 110-525 g ai/ha, 125-200 g ai/ha, 100-165 g ai/ha, 120-150 g ai/ha, 125-450 g ai/ha, 100-145 g ai/ha, or 110-675 g ai/ha.

Azafenidin

Compositions and methods of the present disclosure can include azafenidin or an agriculturally acceptable salt or ester thereof. Azafenidin, as well as methods of preparing azafenidin, are known in the art. Azafenidin, shown below, is 2-[2,4-dichloro-5-(2-propyn-1-yloxy)phenyl]-5,6,7,8-tetrahydro-1,2,4-triazolo[4,3-a]pyridin-3 (2H)-one. According to the online edition of *The Pesticide Manual*, azafenidin is a herbicide that was evaluated by DuPont for use as a pre-emergence and, in mixtures, post-emergence control of annual and perennial weeds in citrus, grapes, olives, sugar cane, and other perennial crops.

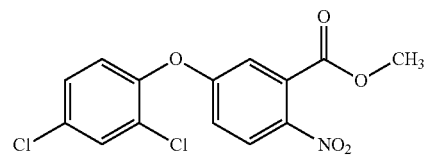

Benzfendizone

Compositions and methods of the present disclosure can include benzfendizone or an agriculturally acceptable salt or ester thereof. Benzfendizone, as well as methods of preparing benzfendizone, are known in the art. Benzfendizone, shown below, is methyl 2-[2-[[4-[3,6-dihydro-3-methyl-2,6-dioxo-4-(trifluoromethyl)-1(2H)-pyrimidinyl]phenoxy]methyl]-5-ethylphenoxy]propanoate. According to the online edition of *The Pesticide Manual*, benzfendizone is a herbicide that was evaluated by FMC for post-emergence control of grass and broadleaf weeds in orchards and no-till situations, and also as a cotton defoliant and potato desiccant.

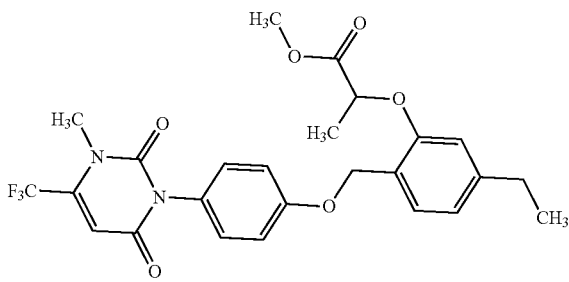

Bifenox

Compositions and methods of the present disclosure can include bifenox or an agriculturally acceptable salt or ester thereof. Bifenox, as well as methods of preparing bifenox, are known in the art. Bifenox, shown below, is methyl 5-(2,4-dichlorophenoxy)-2-nitrobenzoate. Its herbicidal activity is exemplified in *The Pesticide Manual*. Exemplary uses of bifenox include its use for pre-emergence, pre-plant incorporated, or directed post-emergence control of annual broadleaf weeds and some grass weeds in cereals, maize, sorghum, soybeans, rice, etc.

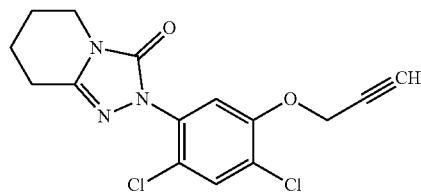 [SMILES: C#CCOc1cc(-n2nc3n(c2=O)CCCC3)c(Cl)cc1Cl]

Bifenox can be applied to the foliage, emerging shoots, and roots of undesirable vegetation in an amount sufficient to induce a herbicidal effect. In some aspects, bifenox is applied to the foliage, emerging shoots, and roots of undesirable vegetation in an amount of 50 g ai/ha or more, such as 60 g ai/ha or more, 70 g ai/ha or more, 80 g ai/ha or more, 90 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 350 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, or 1000 g ai/ha or more; in an amount of 1001 g ai/ha or less, such as 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 90 g ai/ha or less, 80 g ai/ha or less, 70 g ai/ha or less, 65 g ai/ha or less, or 60 g ai/ha or less; or in an amount ranging from any of the minimum values described above to any of the maximum values described above, such as 50-1000 g ai/ha, 100-700 g ai/ha, 225-350 g ai/ha, 300-600 g ai/ha, 70-500 g ai/ha, 500-950 g ai/ha, 750-1000 g ai/ha, 60-800 g ai/ha, 75-750 g ai/ha, 150-450 g ai/ha, 200-900 g ai/ha, 325-650 g ai/ha, 90-500 g ai/ha, 175-250 g ai/ha, 140-800 g ai/ha, 450-500 g ai/ha, 125-850 g ai/ha, 65-140 g ai/ha, or 50-950 g ai/ha.

Butafenacil

Compositions and methods of the present disclosure can include butafenacil or an agriculturally acceptable salt or ester thereof. Butafenacil, as well as methods of preparing butafenacil, are known in the art. Butafenacil, shown below, is 1,1-dimethyl-2-oxo-2-(2-propenyloxy)ethyl-2-chloro-5-[3,6-dihydro-3-methyl-2,6-dioxo-4-(trifluoromethyl)-1(2H)-pyrimidinyl]benzoate. Its herbicidal activity is exemplified in *The Pesticide Manual*. Exemplary uses of butafenacil include its use for post-emergence control of annual and perennial broadleaf weeds in fruit, vineyards, citrus, and non-crop land.

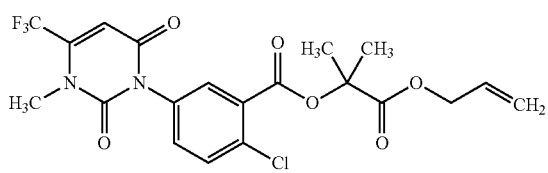 [SMILES: C=CCOC(=O)C(C)(C)OC(=O)c1cc(-n2c(=O)cc(C(F)(F)F)n(C)c2=O)ccc1Cl]

Carfentrazone

Compositions and methods of the present disclosure can include carfentrazone or an agriculturally acceptable salt or ester thereof. Carfentrazone, as well as methods of preparing carfentrazone, are known in the art. Carfentrazone-ethyl, shown below, is a commonly used ester form of carfentrazone with the structure ethyl α,2-dichloro-5-[4-(difluoromethyl)-4,5-dihydro-3-methyl-5-oxo-1H-1,2,4-triazol-1-yl]-4-fluorobenzenepropanoate. Its herbicidal activity is exemplified in *The Pesticide Manual*. Exemplary uses of carfentrazone-ethyl include its use for post-emergence control of broadleaf weeds in cereals and for the desiccation of potatoes.

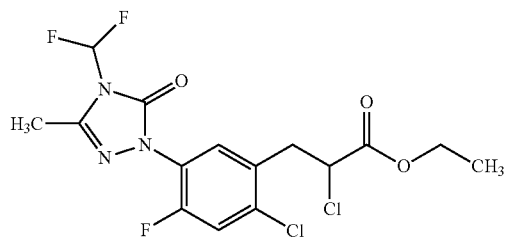 [SMILES: CCOC(=O)C(Cl)Cc1cc(-n2nc(C)n(C(F)F)c2=O)c(F)cc1Cl]

Carfentrazone can be applied to the foliage of undesirable vegetation in an amount sufficient to induce a herbicidal effect. In some aspects, carfentrazone is applied to the foliage of undesirable vegetation in an amount of 0.5 g ai/ha or more, such as 0.6 g ai/ha or more, 0.8 g ai/ha or more, 1 g ai/ha or more, 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 11 g ai/ha or more, 12.5 g ai/ha or more, 15 g ai/ha or more, 17.5 g ai/ha or more, 20 g ai/ha or more, 22.5 g ai/ha or more, 25 g ai/ha or more, 27.5 g ai/ha or more, 30 g ai/ha or more, 32.5 g ai/ha or more, 35 g ai/ha or more, 37.5 g ai/ha or more, 39 g ai/ha or more, 40 g ai/ha or more, 45 g ai/ha or more, 50 g ai/ha or more, 60 g ai/ha or more, 70 g ai/ha or more, or 75 g ai/ha or more; in an amount of 80 g ai/ha or less, such as 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 37.5 g ai/ha or less, 35 g ai/ha or less, 32.5 g ai/ha or less, 30 g ai/ha or less, 27.5 g ai/ha or less, 25 g ai/ha or less, 22.5 g ai/ha or less, 20 g ai/ha or less, 17.5 g ai/ha or less, 15 g ai/ha or less, 12.5 g ai/ha or less, 11 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, 2 g ai/ha or less, 1 g ai/ha or less, 0.8 g ai/ha or less, or 0.6 g ai/ha or less; or in an amount ranging from any of the minimum values described above to any of the maximum values described above, such as 0.5-80 g ai/ha, 1-40 g ai/ha, 3-55 g ai/ha, 5-32.5 g ai/ha, 0.8-70 g ai/ha, 15-70 g ai/ha, 7.5-40 g ai/ha, 20-30 g ai/ha, 0.6-37.5 g ai/ha, 3-30 g ai/ha, 10-25 g ai/ha, 2-17.5 g ai/ha, 40-75 g ai/ha, 4-10 g ai/ha, or 0.6-75 g ai/ha.

Chlomethoxyfen

Compositions and methods of the present disclosure can include chlomethoxyfen or an agriculturally acceptable salt or ester thereof. Chlomethoxyfen, as well as methods of preparing chlomethoxyfen, are known in the art. Chlomethoxyfen, shown below, is 2,4-dichloro-1-(3-methoxy-4-nitrophenoxy)benzene. Its herbicidal activity is exemplified in *The Pesticide Manual*. Exemplary uses of chlomethoxyfen include its use for pre-emergence control of annual weeds in transplanted rice, applied at 1.5-2.5 kg ai/ha.

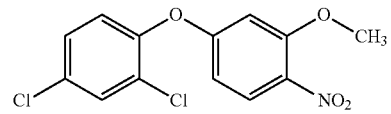 [SMILES: COc1cc(Oc2ccc(Cl)cc2Cl)ccc1[N+](=O)[O-]]

Chlomethoxyfen can be applied to the leaves and stems of undesirable vegetation in an amount sufficient to induce a herbicidal effect. In some aspects, chlomethoxyfen is applied to the leaves and stems of undesirable vegetation in an amount of 250 g ai/ha or more, such as 275 g ai/ha or more, 300 g ai/ha or more, 350 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, or 1000 g ai/ha or more; in an amount of 1001 g ai/ha or less, such as 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, or 250 g ai/ha or less; or in an amount ranging from any of the minimum values described above to any of the maximum values described above, such as 250-1000 g ai/ha, 300-600 g ai/ha, 450-550 g ai/ha, 850-1000 g ai/ha, 250-750 g ai/ha, 275-900 g ai/ha, 300-400 g ai/ha, 475-500 g ai/ha, 250-475 g ai/ha, 275-350 g ai/ha, 300-325 g ai/ha, or 275-950 g ai/ha.

Cinidon

Compositions and methods of the present disclosure can include cinidon or an agriculturally acceptable salt or ester thereof. Cinidon, as well as methods of preparing cinidon, are known in the art. Cinidon-ethyl, shown below, is a commonly used ester of cinidon with the structure ethyl (2Z)-chloro-3-[2-chloro-5-(1,3,4,5,6,7-hexahydro-1,3-dioxo-2H-isoindol-2-yl)phenyl]-2-propenoate. Its herbicidal activity is exemplified in *The Pesticide Manual*. Exemplary uses of cinidon include its use for post-emergence control of annual broadleaf weeds in winter and spring small grain cereals.

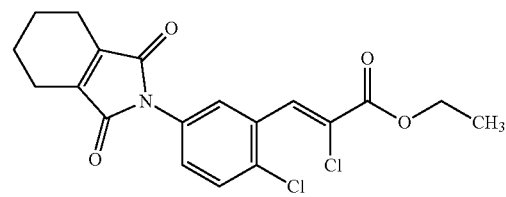 [SMILES: CCOC(=O)/C(Cl)=C/c1cc(N2C(=O)C3=C(CCCC3)C2=O)ccc1Cl]

Cinidon can be applied to the foliage of undesirable vegetation in an amount sufficient to induce a herbicidal effect. In some aspects, cinidon is applied to the foliage of undesirable vegetation in an amount of 0.5 g ai/ha or more, such as 0.6 g ai/ha or more, 0.8 g ai/ha or more, 1 g ai/ha or more, 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 22.5 g ai/ha or more, 25 g ai/ha or more, 27.5 g ai/ha or more, 30 g ai/ha or more, 32.5 g ai/ha or more, 35 g ai/ha or more, 37.5 g ai/ha or more, 39 g ai/ha or more, 40 g ai/ha or more, 45 g ai/ha or more, 50 g ai/ha or more, 60 g ai/ha or more, 70 g ai/ha or more, or 75 g ai/ha or more; in an amount of 80 g ai/ha or less, such as 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 37.5 g ai/ha or less, 35 g ai/ha or less, 32.5 g ai/ha or less, 30 g ai/ha or less, 27.5 g ai/ha or less, 25 g ai/ha or less, 22.5 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, 2 g ai/ha or less, 1 g ai/ha or less, 0.8 g ai/ha or less, or 0.6 g ai/ha or less; or in an amount ranging from any of the minimum values described above to any of the maximum values described above, such as 0.5-80 g ai/ha, 7-70 g ai/ha, 40-60 g ai/ha, 0.6-45 g ai/ha, 37.5-70 g ai/ha, 15-55 g ai/ha, 1-35 g ai/ha, 9-30 g ai/ha, 3-45 g ai/ha, 10-65 g ai/ha, 20-25 g ai/ha, 8-20 g ai/ha, 12-60 g ai/ha, 0.6-12.5 g ai/ha, or 1-75 g ai/ha.

Fluazolate

Compositions and methods of the present disclosure can include fluazolate or an agriculturally acceptable salt or ester thereof. Fluazolate, as well as methods of preparing fluazolate, are known in the art. Fluazolate, shown below, is 1-methylethyl 5-[4-bromo-1-methyl-5-(trifluoromethyl)-1H-pyrazol-3-yl]-2-chloro-4-fluorobenzoate. According to the online edition of *The Pesticide Manual*, fluazolate is a herbicide under development for use as pre-emergence control of grasses and broadleaf weeds on cereals.

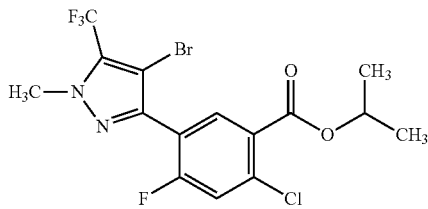 [SMILES: CC(C)OC(=O)c1cc(-c2nn(C)c(C(F)(F)F)c2Br)c(F)cc1Cl]

Fluazolate can be applied to undesirable vegetation or applied to soil to prevent the emergence or growth of undesirable vegetation in an amount sufficient to induce a herbicidal effect. In some aspects, fluazolate is applied to undesirable vegetation or applied to soil to prevent the emergence or growth of undesirable vegetation in an amount of 50 g ai/ha or more, such as 55 g ai/ha or more, 60 g ai/ha or more, 65 g ai/ha or more, 70 g ai/ha or more, 75 g ai/ha or more, 80 g ai/ha or more, 90 g ai/ha or more, 100 g ai/ha or more, 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 210 g ai/ha or more, 220 g ai/ha or more, 225 g ai/ha or more, 230 g ai/ha or more, 240 g ai/ha or more, or 250 g ai/ha or more; in an amount of 250 g ai/ha or less, such as 240 g ai/ha or less, 230 g ai/ha or less, 225 g ai/ha or less, 220 g ai/ha or less, 210 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, 110 g ai/ha or less, 100 g ai/ha or less, 90 g ai/ha or less, 80 g ai/ha or less, 75 g ai/ha or less, 70 g ai/ha or less, 65 g ai/ha or less, 60 g ai/ha or less, or 55 g ai/ha or less; or in an amount ranging from any of the minimum values described above to any of the maximum values described above, such as 50-250 g ai/ha, 65-175 g ai/ha, 100-230 g ai/ha, 150-210 g ai/ha, 200-250 g ai/ha, 55-200 g ai/ha, 90-230 g ai/ha, 60-190 g ai/ha, 125-175 g ai/ha, 80-150 g ai/ha, 90-145 g ai/ha, 100-125 g ai/ha, 80-115 g ai/ha, or 55-240 g ai/ha.

Flufenpyr

Compositions and methods of the present disclosure can include flufenpyr or an agriculturally acceptable salt or ester thereof. Flufenpyr, as well as methods of preparing flufenpyr, are known in the art. Flufenpyr-ethyl, shown below, is a commonly-used ester of flufenpyr, whose structure is ethyl [2-chloro-4-fluoro-5-[5-methyl-6-oxo-4-(trifluoromethyl)-1(6H)-pyridazinyl]phenoxy]acetate. Its herbicidal activity is exemplified in *The Pesticide Manual*. Exemplary uses of flufenpyr include its use for control of velvetleaf and morning glory in maize, soybeans, and sugar cane.

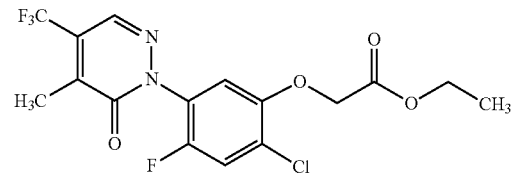 [SMILES: CCOC(=O)COc1cc(-n2ncc(C(F)(F)F)c(C)c2=O)c(F)cc1Cl]

Flufenpyr can be applied to the foliage of undesirable vegetation in an amount sufficient to induce a herbicidal effect. In some aspects, flufenpyr is applied to the foliage of undesirable vegetation in an amount of 0.5 g ai/ha or more, such as 0.6 g ai/ha or more, 0.8 g ai/ha or more, 1 g ai/ha or more, 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 22.5 g ai/ha or more, 25 g ai/ha or more, 27.5 g ai/ha or more, 30 g ai/ha or more, 32.5 g ai/ha or more, 35 g ai/ha or more, 37.5 g ai/ha or more, 39 g ai/ha or more, 40 g ai/ha or more, 45 g ai/ha or more, 50 g ai/ha or more, 60 g ai/ha or more, or 70 g ai/ha or more; in an amount of 75 g ai/ha or less, such as 70 g ai/ha or less, 65 g ai/ha or less, 60 g ai/ha or less, 55 g ai/ha or less, 50 g ai/ha or less, 45 g ai/ha or less, 40 g ai/ha or less, 37.5 g ai/ha or less, 35 g ai/ha or less, 32.5 g ai/ha or less, 30 g ai/ha or less, 27.5 g ai/ha or less, 25 g ai/ha or less, 22.5 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, 2 g ai/ha or less, 1 g ai/ha or less, 0.8 g ai/ha or less, or 0.6 g ai/ha or less; or in an amount ranging from any of the minimum values described above to any of the maximum values described above, such as 0.5-75 g ai/ha, 4-45 g ai/ha, 15-70 g ai/ha, 5-60 g ai/ha, 8-40 g ai/ha, 1-25 g ai/ha, 2-32.5 g ai/ha, 0.6-20 g ai/ha, 10-30 g ai/ha, 0.5-17.5 g ai/ha, 9-15 g ai/ha, 7-55 g ai/ha, 9-15 g ai/ha, 1-9 g ai/ha, 4-10 g ai/ha, or 0.6-70 g ai/ha.

Flumiclorac

Compositions and methods of the present disclosure can include flumiclorac-pentyl or an agriculturally acceptable salt or ester thereof. Flumiclorac, as well as methods of preparing flumiclorac, are known in the art. Flumiclorac-pentyl, shown below, is a commonly-used ester of flumiclorac, whose structure is pentyl 2-[2-chloro-4-fluoro-5-(1,3,4,5,6,7-hexahydro-1,3-dioxo-2H-isoindol-2-yl)-phenoxy]acetate. Its herbicidal activity is exemplified in *The Pesticide Manual*. Exemplary uses of flumiclorac include its use for pre- and post-emergence control of broadleaf weeds in maize and soybeans, applied at 30-60 g ai/ha.

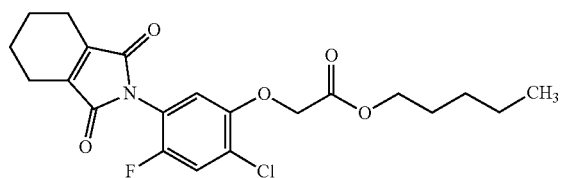 [SMILES: CCCCCOC(=O)COc1cc(N2C(=O)C3=C(CCCC3)C2=O)c(F)cc1Cl]

Flumiclorac can be applied to the foliage of undesirable vegetation in an amount sufficient to induce a herbicidal effect. In some aspects, flumiclorac is applied to the foliage of undesirable vegetation in an amount of 0.5 g ai/ha or more, such as 0.6 g ai/ha or more, 0.8 g ai/ha or more, 1 g ai/ha or more, 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 22.5 g ai/ha or more, 25 g ai/ha or more, 27.5 g ai/ha or more, 30 g ai/ha or more, 32.5 g ai/ha or more, 35 g ai/ha or more, 37.5 g ai/ha or more, 39 g ai/ha or more, 40 g ai/ha or more, 45 g ai/ha or more, 50 g ai/ha or more, 60 g ai/ha or more, 70 g ai/ha or more, or 75 g ai/ha or more; in an amount of 80 g ai/ha or less, such as 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 37.5 g ai/ha or less, 35 g ai/ha or less, 32.5 g ai/ha or less, 30 g ai/ha or less, 27.5 g ai/ha or less, 25 g ai/ha or less, 22.5 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, 2 g ai/ha or less, 1 g ai/ha or less, 0.8 g ai/ha or less, or 0.6 g ai/ha or less; or in an amount ranging from any of the minimum values described above to any of the maximum values described above, such as 0.5-80 g ai/ha, 9-75 g ai/ha, 30-60 g ai/ha, 2-50 g ai/ha, 15-70 g ai/ha, 0.5-32.5 g ai/ha, 1-25 g ai/ha, 10-65 g ai/ha, 4-20 g ai/ha, 0.8-17.5 g ai/ha, 11-35 g ai/ha, 27.5-50 g ai/ha, or 0.6-75 g ai/ha.

Flumioxazin

Compositions and methods of the present disclosure can include flumioxazin or an agriculturally acceptable salt or ester thereof. Flumioxazin, as well as methods of preparing flumioxazin, are known in the art. Flumioxazin, shown below, is 2-[7-fluoro-3,4-dihydro-3-oxo-4-(2-propynyl)-2H-1,4-benzoxazin-6-yl]-4,5,6,7-tetrahydro-1H-isoindole-1,3(2H)-dione. Its herbicidal activity is exemplified in *The Pesticide Manual*. Exemplary uses of flumioxazin include its use for pre-emergence control of annual broadleaf weeds and some annual grass weeds in soybeans, peanuts, orchards, vines, and other crops.

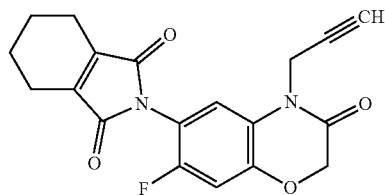 [SMILES: C#CCN1C(=O)COc2cc(F)c(N3C(=O)C4=C(CCCC4)C3=O)cc21]

Flumioxazin can be applied to the undesirable vegetation or applied to soil to prevent the emergence or growth of undesirable vegetation in an amount sufficient to induce a herbicidal effect. In some aspects, is applied to the undesirable vegetation or applied to soil to prevent the emergence or growth of undesirable vegetation in an amount of 50 g ai/ha or more, such as 60 g ai/ha or more, 70 g ai/ha or more, 75 g ai/ha or more, 80 g ai/ha or more, 90 g ai/ha or more, 100 g ai/ha or more, 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 220 g ai/ha or more, 240 g ai/ha or more, 250 g ai/ha or more, 260 g ai/ha or more, 280 g ai/ha or more, 300 g ai/ha or more, 325 g ai/ha or more, 350 g ai/ha or more, 375 g ai/ha or more, 400 g ai/ha or more, or 450 g ai/ha or more; in an amount of 500 g ai/ha or less, such as 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, 280 g ai/ha or less, 260 g ai/ha or less, 250 g ai/ha or less, 240 g ai/ha or less, 220 g ai/ha or less, 210 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, 110 g ai/ha or less, 100 g ai/ha or less, 90 g ai/ha or less, 80 g ai/ha or less, 75 g ai/ha or less, 70 g ai/ha or less, or 60 g ai/ha or less; or in an amount ranging from any of the minimum values described above to any of the maximum values described above, such as 50-500 g ai/ha, 125-300 g ai/ha, 225-500 g ai/ha, 250-500 g ai/ha, 275-475 g ai/ha, 400-450 g ai/ha, 75-200 g ai/ha, 125-260 g ai/ha, 300-375 g ai/ha, ai/ha, 60-375 g ai/ha, 80-300 g ai/ha, 90-170 g ai/ha, 125-400 g ai/ha, 100-250 g ai/ha, 50-240 g ai/ha, 90-200 g ai/ha, 110-190 g ai/ha, 75-175 g ai/ha, 60-160 g ai/ha, 90-450 g ai/ha, 100-110 g ai/ha, or 60-475 g ai/ha.

Fluoroglycofen

Compositions and methods of the present disclosure can include fluoroglycofen or an agriculturally acceptable salt or ester thereof. Fluoroglycofen, as well as methods of preparing fluoroglycofen, are known in the art. Fluoroglycofen-ethyl, shown below, is a commonly-used ester of fluoroglycofen, whose structure is carboxymethyl 5-[2-chloro-4-(trifluoromethyl)phenoxy]-2-nitrobenzoate. Its herbicidal activity is exemplified in *The Pesticide Manual*. Exemplary uses of fluoroglycofen include its use for post-emergence control of broadleaf weeds and grass weeds in wheat, barley, oats, peanuts, rice, and soybeans.

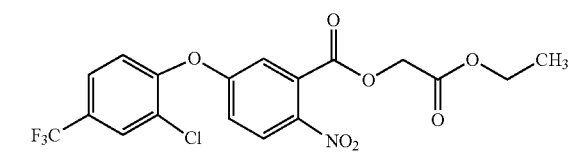 [SMILES: CCOC(=O)COC(=O)c1cc(Oc2ccc(C(F)(F)F)cc2Cl)ccc1[N+](=O)[O-]]

Fluoroglycofen thereof can be applied to the foliage or roots of undesirable vegetation in an amount sufficient to induce a herbicidal effect. In some aspects, fluoroglycofen is applied to the foliage or roots of undesirable vegetation in an amount of 0.5 g ai/ha or more, such as 0.6 g ai/ha or more, 0.8 g ai/ha or more, 1 g ai/ha or more, 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 22.5 g ai/ha or more, 25 g ai/ha or more, 27.5 g ai/ha or more, 30 g ai/ha or more, 32.5 g ai/ha or more, 35 g ai/ha or more, 37.5 g ai/ha or more, 39 g ai/ha or more, 40 g ai/ha or more, 45 g ai/ha or more, 50 g ai/ha or more, 60 g ai/ha or more, 70 g ai/ha or more, or 75 g ai/ha or more; in an amount of 80 g ai/ha or less, such as 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 37.5 g ai/ha or less, 35 g ai/ha or less, 32.5 g ai/ha or less, 30 g ai/ha or less, 27.5 g ai/ha or less, 25 g ai/ha or less, 22.5 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, 2 g ai/ha or less, 1 g ai/ha or less, 0.8 g ai/ha or less, or 0.6 g ai/ha or less; or in an amount ranging from any of the minimum values described above to any of the maximum values described above, such as 0.5-80 g ai/ha, 3-20 g ai/ha, 40-70 g ai/ha, 2-65 g ai/ha, 5-50 g ai/ha, 1-45 g ai/ha, 7-25 g ai/ha, 5-37.5 g ai/ha, 8-60 g ai/ha, 1-17.5 g ai/ha, 6-30 g ai/ha, 2-9 g ai/ha, 0.6-75 g ai/ha.

Fluthiacet

Compositions and methods of the present disclosure can include fluthiacet or an agriculturally acceptable salt or ester thereof. Fluthiacet, as well as methods of preparing fluthiacet, are known in the art. Fluthiacet-methyl, shown below, is a commonly-used ester of fluthiacet, whose structure is methyl 2-[[2-chloro-4-fluoro-5-[(tetrahydro-3-oxo-1H,3H-[1,3,4]thiadiazolo[3,4-a]pyridazin-1-ylidene)amino]-phenyl]thio]acetate. Its herbicidal activity is exemplified in The Pesticide Manual. Exemplary uses of fluthiacet-methyl include its use for post-emergence control of broadleaf weeds in maize and soybeans, applied at 4-15 g ai/ha.

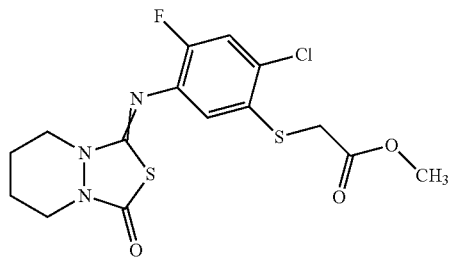 [SMILES: COC(=O)CSc1cc(N=c2sc(=O)n3n2CCCC3)c(F)cc1Cl]

Fluthiacet can be applied to the foliage of undesirable vegetation in an amount sufficient to induce a herbicidal effect. In some aspects, fluthiacet is applied to the foliage of undesirable vegetation in an amount of 0.5 g ai/ha or more, such as 0.6 g ai/ha or more, 0.8 g ai/ha or more, 1 g ai/ha or more, 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 22.5 g ai/ha or more, 25 g ai/ha or more, 27.5 g ai/ha or more, 30 g ai/ha or more, 32.5 g ai/ha or more, 35 g ai/ha or more, 37.5 g ai/ha or more, 39 g ai/ha or more, 40 g ai/ha or more, or 45 g ai/ha or more; in an amount of 50 g ai/ha or less, such as 45 g ai/ha or less, 40 g ai/ha or less, 37.5 g ai/ha or less, 35 g ai/ha or less, 32.5 g ai/ha or less, 30 g ai/ha or less, 27.5 g ai/ha or less, 25 g ai/ha or less, 22.5 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, 2 g ai/ha or less, 1 g ai/ha or less, 0.8 g ai/ha or less, or 0.6 g ai/ha or less; or in an amount ranging from any of the minimum values described above to any of the maximum values described above, such as 0.5-50 g ai/ha, 0.8-20 g, 9-45 g ai/ha, 5-37.5 g ai/ha, 10-15 g ai/ha, 20-30 g ai/ha, 7-25 g ai/ha, 1-20 g ai/ha, 3-30 g ai/ha, 12.5-45 g ai/ha, 1-10 g ai/ha, 6-40 g ai/ha, or 0.6-45 g ai/ha.

Fomesafen

Compositions and methods of the present disclosure can include fomesafen or an agriculturally acceptable salt or ester thereof. Fomesafen, as well as methods of preparing fomesafen, are known in the art. Fomesafen, shown below, is 5-[2-chloro-4-(trifluoromethyl)phenoxy]-N-(methylsulfonyl)-2-nitrobenzamide. Its herbicidal activity is exemplified in The Pesticide Manual. Exemplary uses of fomesafen include its use for early post-emergence control of broadleaf weeds in soybeans, applied at 200-400 g ai/ha.

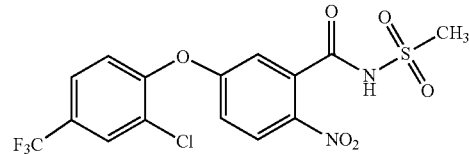 [SMILES: CS(=O)(=O)NC(=O)c1cc(Oc2ccc(C(F)(F)F)cc2Cl)ccc1[N+](=O)[O-]]

Fomesafen can be applied to the foliage and roots of undesirable vegetation in an amount sufficient to induce a herbicidal effect. In some aspects, fomesafen is applied to the foliage and roots of undesirable vegetation in an amount of 100 g ai/ha or more, such as 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 210 g ai/ha or more, 220 g ai/ha or more, 225 g ai/ha or more, 230 g ai/ha or more, 240 g ai/ha or more, 250 g ai/ha or more, 260 g ai/ha or more, 270 g ai/ha or more, 275 g ai/ha or more, 280 g ai/ha or more, 290 g ai/ha or more, 300 g ai/ha or more, 320 g ai/ha or more, 340 g ai/ha or more, 350 g ai/ha or more, 360 g ai/ha or more, 380 g ai/ha or more, 400 g ai/ha or more, 425 g ai/ha or more, 450 g ai/ha or more, or 475 g ai/ha or more; in an amount of 500 g ai/ha or less, such as 475 g ai/ha or less, 450 g ai/ha or less, 425 g ai/ha or less, 400 g ai/ha or less, 380 g ai/ha or less, 375 g ai/ha or less, 360 g ai/ha or less, 350 g ai/ha or less, 340 g ai/ha or less, 325 g ai/ha or less, 320 g ai/ha or less, 300 g ai/ha or less, 290 g ai/ha or less, 280 g ai/ha or less, 275 g ai/ha or less, 270 g ai/ha or less, 260 g ai/ha or less, 250 g ai/ha or less, 240 g ai/ha or less, 230 g ai/ha or less, 225 g ai/ha or less, 220 g ai/ha or less, 210 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, or 110 g ai/ha or less; or in an amount ranging from any of the minimum values described above to any of the maximum values described above, such as 100-500 g ai/ha, 175-300 g ai/ha, 225-475 g ai/ha, 100-400 g ai/ha, 170-375 g ai/ha, 120-250 g ai/ha, 180-300 g ai/ha, 110-250 g ai/ha, 130-210 g ai/ha, 160-200 g ai/ha, 100-180 g ai/ha, 210-375 g ai/ha, 150-275 g ai/ha, 190-450 g ai/ha, 120-140 g ai/ha, or 110-475 g ai/ha.

Halosafen

Compositions and methods of the present disclosure can include halosafen or an agriculturally acceptable salt or ester thereof. Halosafen, as well as methods of preparing halosafen, are known in the art. Halosafen, shown below, is 5-[2-chloro-6-fluoro-4-(trifluoromethyl)phenoxy]-N-(ethylsulfonyl)-2-nitrobenzamide. According to the online edition of The Pesticide Manual, halosafen is a herbicide that was evaluated by ICI Agrochemicals.

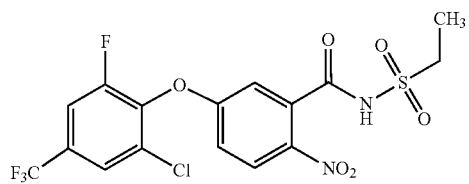 [SMILES: CCS(=O)(=O)NC(=O)c1cc(Oc2c(F)cc(C(F)(F)F)cc2Cl)ccc1[N+](=O)[O-]]

Lactofen

Compositions and methods of the present disclosure can include lactofen or an agriculturally acceptable salt or ester thereof. Lactofen, as well as methods of preparing lactofen, are known in the art. Lactofen, shown below, is 2-ethoxy-1-methyl-2-oxoethyl 5-[2-chloro-4-(trifluoromethyl)phenoxy]-2-nitrobenzoate. Its herbicidal activity is exemplified in The Pesticide Manual. Exemplary uses of lactofen include its use for post-emergence control of broadleaf weeds cotton, soybeans, and snap beans, applied at 220 g ai/ha.

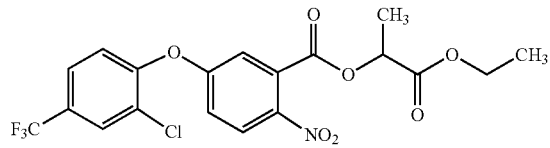 [SMILES: CCOC(=O)C(C)OC(=O)c1cc(Oc2ccc(C(F)(F)F)cc2Cl)ccc1[N+](=O)[O-]]

Lactofen can be applied to the foliage of undesirable vegetation in an amount sufficient to induce a herbicidal effect. In some aspects, lactofen is applied to the foliage of undesirable vegetation in an amount of 50 g ai/ha or more, such as 60 g ai/ha or more, 70 g ai/ha or more, 75 g ai/ha or more, 80 g ai/ha or more, 90 g ai/ha or more, 100 g ai/ha or more, 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 220 g ai/ha or more, 240 g ai/ha or more, 250 g ai/ha or more, 260 g ai/ha or more, 280 g ai/ha or more, 300 g ai/ha or more, 325 g ai/ha or more, 350 g ai/ha or more, 375 g ai/ha or more, 400 g ai/ha or more, or 450 g ai/ha or more; in an amount of 500 g ai/ha or less, such as 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, 280 g ai/ha or less, 260 g ai/ha or less, 250 g ai/ha or less, 240 g ai/ha or less, 220 g ai/ha or less, 210 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, 110 g ai/ha or less, 100 g ai/ha or less, 90 g ai/ha or less, 80 g ai/ha or less, 75 g ai/ha or less, 70 g ai/ha or less, or 60 g ai/ha or less; or in an amount ranging from any of the minimum values described above to any of the maximum values described above, such as 50-500 g ai/ha, 175-350 g ai/ha, 220-450 g ai/ha, 75-400 g ai/ha, 60-375 g ai/ha, 80-250 g ai/ha, 90-220 g ai/ha, 110-280 g ai/ha, 70-190 g ai/ha, 160-200 g ai/ha, 50-180 g ai/ha, 120-150 g ai/ha, 80-240 g ai/ha, 75-350 g ai/ha, 50-130 g ai/ha, or 60-475 g ai/ha.

Oxadiargyl

Compositions and methods of the present disclosure can include oxadiargyl or an agriculturally acceptable salt or ester thereof. Oxadiargyl, as well as methods of preparing oxadiargyl, are known in the art. Oxadiargyl, shown below, is 3-[2,4-dichloro-5-(2-propyn-1-yloxy)phenyl]-5-(1,1-dimethylethyl)-1,3,4-oxadiazol-2(3H)-one. Its herbicidal activity is exemplified in The Pesticide Manual. Exemplary uses of oxadiargyl include its use for pre- and early post-emergence control of broadleaf weeds, grass weeds, and annual sedge weeds in rice, applied at 50-150 g ai/ha, sunflowers, potatoes, vegetables, and sugar cane, applied at 300-500 g ai/ha, and fruit and citrus, applied at 500-1500 g ai/ha.

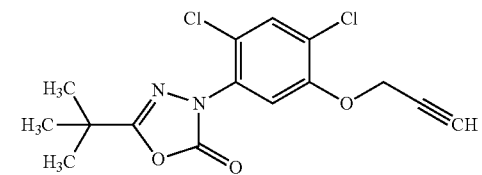 [SMILES: C#CCOc1cc(-n2nc(C(C)(C)C)oc2=O)c(Cl)cc1Cl]

Oxadiargyl thereof can be applied to undesirable vegetation or applied to soil or water to prevent the emergence or growth of undesirable vegetation in an amount sufficient to induce a herbicidal effect. In some aspects, oxadiargyl is applied to undesirable vegetation or applied to soil or water to prevent the emergence or growth of undesirable vegetation in an amount of 25 g ai/ha or more, such as 40 g ai/ha or more, 50 g ai/ha or more, 60 g ai/ha or more, 80 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 350 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, or 950 g ai/ha or more; in an amount of 1001 g ai/ha or less, such as 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 80 g ai/ha or less, 60 g ai/ha or less, 50 g ai/ha or less, 40 g ai/ha or less, or 30 g ai/ha or less; or in an amount ranging from any of the minimum values described above to any of the maximum values described above, such as 25-1000 g ai/ha, 250-500 g ai/ha, 100-800 g ai/ha, 325-750 g ai/ha, 600-800 g ai/ha, 50-550 g ai/ha, 90-900 g ai/ha, 150-600 g ai/ha, 350-700 g ai/ha, 400-500 g ai/ha, 25-425 g ai/ha, 50-375 g ai/ha, 450-900 g ai/ha, 200-600 g ai/ha, 80-225 g ai/ha, 25-175 g ai/ha, 100-150 g ai/ha, 25-80 g ai/ha, or 30-950 g ai/ha.

Oxadiazon

Compositions and methods of the present disclosure can include oxadiazon or an agriculturally acceptable salt or ester thereof. Oxadiazon, as well as methods of preparing oxadiazon, are known in the art. Oxadiazon, shown below, is 3-[2,4-dichloro-5-(1-methylethoxy)phenyl]-5-(1,1-dimethylethyl)-1,3,4-oxadiazol-2(3H)-one. Its herbicidal activity is exemplified in *The Pesticide Manual*. Exemplary uses of oxadiazon include: its use for pre-emergence control of bindweed, annual broadleaf weeds, and grass weeds; post-emergence control of bindweed and annual broadleaf weeds in carnations, roses, ornamental trees and shrubs, tree fruit, bush fruit, citrus, vines, hops, cotton, rice, soybeans, sunflowers, onions, and turf; and pre-emergent or post-emergent control of annual broadleaf and grass weeds in orchards and vineyards.

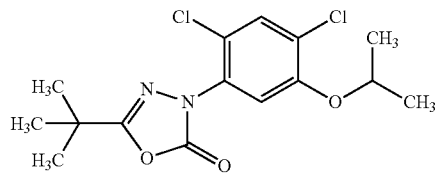 [SMILES: CC(C)Oc1cc(-n2nc(C(C)(C)C)oc2=O)c(Cl)cc1Cl]

Oxadiazon can be applied to undesirable vegetation or applied to soil or water to prevent the emergence or growth of undesirable vegetation in an amount sufficient to induce a herbicidal effect. In some aspects, oxadiazon is applied to undesirable vegetation or applied to soil or water to prevent the emergence or growth of undesirable vegetation in an amount of 250 g ai/ha or more, such as 275 g ai/ha or more, 300 g ai/ha or more, 350 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, or 950 g ai/ha or more; in an amount of 1001 g ai/ha or less, such as 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 375 g ai/ha or less, 350 g ai/ha or less, 325 g ai/ha or less, 300 g ai/ha or less, or 275 g ai/ha or less; or in an amount ranging from any of the minimum values described above to any of the maximum values described above, such as 250-1000 g ai/ha, 600-1000 g ai/ha, 350-900 g ai/ha, 275-750 g ai/ha, 400-950 g ai/ha, 650-800 g ai/ha, 250-550 g ai/ha, 325-700 g ai/ha, 450-850 g ai/ha, 250-375 g ai/ha, 300-600 g ai/ha, 250-400 g ai/ha, or 275-950 g ai/ha.

Oxyfluorfen

Compositions and methods of the present disclosure can include oxyfluorfen or an agriculturally acceptable salt or ester thereof. Oxyfluorfen, as well as methods of preparing oxyfluorfen, are known in the art. Oxyfluorfen, shown below, is 2-chloro-1-(3-ethoxy-4-nitrophenoxy)-4-(trifluoromethyl)benzene. Its herbicidal activity is exemplified in *The Pesticide Manual*. Exemplary uses of oxyfluorfen include its use for pre- and post-emergence control of annual broadleaf and grass weeds in tree fruit, citrus, vines, nuts, cereals, maize, soybeans, peanuts, rice, cotton, bananas, peppermint, onions, garlic, ornamentals, and conifer seedbeds, applied at 250-2000 g ai/ha.

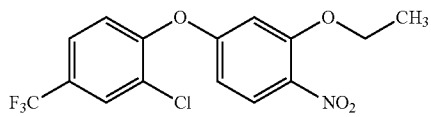 [SMILES: CCOc1cc(Oc2ccc(C(F)(F)F)cc2Cl)ccc1[N+](=O)[O-]]

Oxyfluorfen can be applied to the foliage and shoots of undesirable vegetation in an amount sufficient to induce a herbicidal effect. In some aspects, oxyfluorfen is applied to the foliage and shoots of undesirable vegetation in an amount of 50 g ai/ha or more, such as 75 g ai/ha or more, 100 g ai/ha or more, 125 g ai/ha or more, 150 g ai/ha or more, 175 g ai/ha or more, 200 g ai/ha or more, 250 g ai/ha or more, 300 g ai/ha or more, 350 g ai/ha or more, 400 g ai/ha or more, 450 g ai/ha or more, 500 g ai/ha or more, 550 g ai/ha or more, 600 g ai/ha or more, 700 g ai/ha or more, 750 g ai/ha or more, 800 g ai/ha or more, 900 g ai/ha or more, or 950 g ai/ha or more; in an amount of 1001 g ai/ha or less, such as 1000 g ai/ha or less, 900 g ai/ha or less, 800 g ai/ha or less, 750 g ai/ha or less, 700 g ai/ha or less, 600 g ai/ha or less, 550 g ai/ha or less, 500 g ai/ha or less, 450 g ai/ha or less, 400 g ai/ha or less, 350 g ai/ha or less, 300 g ai/ha or less, 250 g ai/ha or less, 200 g ai/ha or less, 175 g ai/ha or less, 150 g ai/ha or less, 125 g ai/ha or less, 100 g ai/ha or less, 75 g ai/ha or less, or 60 g ai/ha or less; or in an amount ranging from any of the minimum values described above to any of the maximum values described above, such as 50-1000 g ai/ha, 750-1000 g ai/ha, 100-900 g ai/ha, 150-750 g ai/ha, 500-800 g ai/ha, 50-600 g ai/ha, 125-500 g ai/ha, 250-900 g ai/ha, 60-450 g ai/ha, 175-300 g ai/ha, 125-250 g ai/ha, 75-200 g ai/ha, 100-175 g ai/ha, 150-800 g ai/ha, 75-550 g ai/ha, 50-125 g ai/ha, or 60-900 g ai/ha.

Pentoxazone

Compositions and methods of the present disclosure can include pentoxazone or an agriculturally acceptable salt or ester thereof. Pentoxazone, as well as methods of preparing pentoxazone, are known in the art. Pentoxazone, shown below, is 3-(4-chloro-5-(cyclopentyloxy)-2-fluorophenyl]-5-(1-methylethylidene)-2,4-oxazolidinedione. Its herbicidal activity is exemplified in *The Pesticide Manual*. Exemplary uses of pentoxazone include its use for pre- and post-emergence control of *Echinochloa* spp. and *Monochoria vaginalis* in paddy rice.

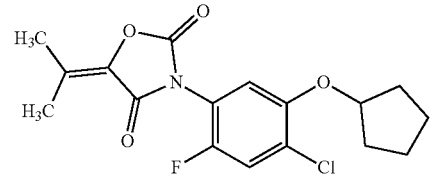 [SMILES: CC(C)=C1OC(=O)N(c2cc(OC3CCCC3)c(Cl)cc2F)C1=O]

Pentoxazone thereof can be applied to undesirable vegetation or applied to soil or water to prevent the emergence or growth of undesirable vegetation in an amount sufficient to induce a herbicidal effect. In some aspects, pentoxazone is applied to undesirable vegetation or applied to soil or water to prevent the emergence or growth of undesirable vegetation in an amount of 50 g ai/ha or more, such as 60 g ai/ha or more, 70 g ai/ha or more, 75 g ai/ha or more, 80 g ai/ha or more, 90 g ai/ha or more, 100 g ai/ha or more, 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 220 g ai/ha or more, 240 g ai/ha or more, 250 g ai/ha or more, 260 g ai/ha or more, 280 g ai/ha or more, 300 g ai/ha or more, 325 g ai/ha or more, 350 g ai/ha or more, 375 g ai/ha or more, 400 g ai/ha or more, 450 g ai/ha or more, or 475 g ai/ha or more; in an amount of 500 g ai/ha or less, such as 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, 280 g ai/ha or less, 260 g ai/ha or less, 250 g ai/ha or less, 240 g ai/ha or less, 220 g ai/ha or less, 210 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, 110 g ai/ha or less, 100 g ai/ha or less, 90 g ai/ha or less, 80 g ai/ha or less, 75 g ai/ha or less, 70 g ai/ha or less, or 60 g ai/ha or less; or in an amount ranging from any of the minimum values described above to any of the maximum values described above, such as 50-500 g ai/ha, 70-200 g ai/ha, 210-350 g ai/ha, 60-425 g ai/ha, 100-400 g ai/ha, 90-375 g ai/ha, 120-400 g ai/ha, 220-450 g ai/ha, 100-250 g ai/ha, 160-350 g ai/ha, 190-400 g ai/ha, 50-240 g ai/ha, 70-210 g ai/ha, 180-400 g ai/ha, 125-375 g ai/ha, 90-150 g ai/ha, 250-400 g ai/ha, or 60-475 g ai/ha.

Profluazol

Compositions and methods of the present disclosure can include profluazol or an agriculturally acceptable salt or ester thereof. Profluazol, as well as methods of preparing profluazol, are known in the art. Profluazol, shown below, is 1-chloro-N-[2-chloro-4-fluoro-5-[(6S,7aR)-6-fluorotetra-hydro-1,3-dioxo-1H-pyrrolo[1,2-c]imidazol-2 (3H)-yl]phenyl]methanesulfonamide. According to the online edition of *The Pesticide Manual*, profluazol is a herbicide developed by DuPont.

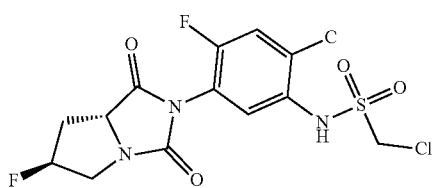

Pyraclonil

Compositions and methods of the present disclosure can include pyraclonil or an agriculturally acceptable salt or ester thereof. Pyraclonil, as well as methods of preparing pyraclonil, are known in the art. Pyraclonil, shown below, is 1-(3-chloro-4,5,6,7-tetrahydropyrazolo[1,5-a]pyridin-2-yl)-5-[methyl-2-propynylamino]-1H-pyrazole-4-carbonitrile. According to the online edition of *The Pesticide Manual*, pyraclonil is being evaluated for pre-emergence control of broadleaf and sedge weeds in rice.

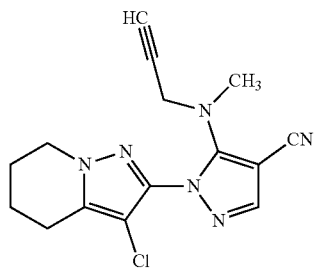 [SMILES: C#CCN(C)c1c(C#N)cnn1-c1nn2c(c1Cl)CCCC2]

Pyraclonil can be applied to undesirable vegetation or applied to soil or water to prevent the emergence or growth of undesirable vegetation in an amount sufficient to induce a herbicidal effect. In some aspects, pyraclonil is applied to undesirable vegetation or applied to soil or water to prevent the emergence or growth of undesirable vegetation in an amount of 5 g ai/ha or more, such as 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 22.5 g ai/ha or more, 25 g ai/ha or more, 27.5 g ai/ha or more, 30 g ai/ha or more, 32.5 g ai/ha or more, 35 g ai/ha or more, 37.5 g ai/ha or more, 39 g ai/ha or more, 40 g ai/ha or more, 45 g ai/ha or more, 50 g ai/ha or more, 60 g ai/ha or more, 70 g ai/ha or more, 75 g ai/ha or more, 80 g ai/ha or more, 90 g ai/ha or more, or 95 g ai/ha or more; in an amount of 100 g ai/ha or less, such as 90 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 37.5 g ai/ha or less, 35 g ai/ha or less, 32.5 g ai/ha or less, 30 g ai/ha or less, 27.5 g ai/ha or less, 25 g ai/ha or less, 22.5 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, or 6 g ai/ha or less; or in an amount ranging from any of the minimum values described above to any of the maximum values described above, such as 5-100 g ai/ha, 40-70 g ai/ha, 8-90 g ai/ha, 6-75 g ai/ha, 15-55 g ai/ha, 50-80 g ai/ha, 25-65 g ai/ha, 15-90 g ai/ha, 9-45 g ai/ha, 5-32.5 g ai/ha, 12.5-65 g ai/ha, 20-25 g ai/ha, 6-20 g ai/ha, 10-17.5 g ai/ha, 22.5-55 g ai/ha, or 6-90 g ai/ha.

Pyraflufen

Compositions and methods of the present disclosure can include pyraflufen or an agriculturally acceptable salt or ester thereof. Pyraflufen as well as methods of preparing pyraflufen-ethyl, are known in the art. Pyraflufen-ethyl, shown below, is a commonly used ester of pyraflufen, whose structure is ethyl 2-chloro-5-[4-chloro-5-(difluoromethoxy)-1-methyl-1H-pyrazol-3-yl]-4-fluorophenoxyacetate. Its herbicidal activity is exemplified in *The Pesticide Manual*. Exemplary uses of pyraflufen include its use for post-emergence control of broadleaf weeds in cereals.

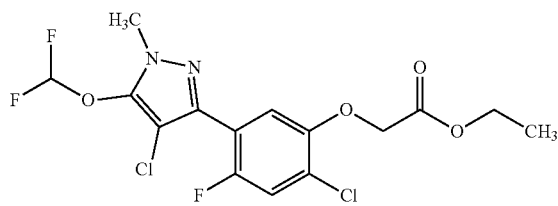 [SMILES: CCOC(=O)COc1cc(-c2nn(C)c(OC(F)F)c2Cl)c(F)cc1Cl]

Pyraflufen can be applied to the foliage of undesirable vegetation in an amount sufficient to induce a herbicidal effect. In some aspects, pyraflufen is applied to the foliage of undesirable vegetation in an amount of 0.5 g ai/ha or more, such as 0.6 g ai/ha or more, 0.8 g ai/ha or more, 1 g ai/ha or more, 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 22.5 g ai/ha or more, 25 g ai/ha or more, 27.5 g ai/ha or more, 30 g ai/ha or more, 32.5 g ai/ha or more, 35 g ai/ha or more, 37.5 g ai/ha or more, or 39 g ai/ha or more; in an amount of 40 g ai/ha or less, such as 37.5 g ai/ha or less, 35 g ai/ha or less, 32.5 g ai/ha or less, 30 g ai/ha or less, 27.5 g ai/ha or less, 25 g ai/ha or less, 22.5 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, 2 g ai/ha or less, 1 g ai/ha or less, 0.8 g ai/ha or less, or 0.6 g ai/ha or less; or in an amount ranging from any of the minimum values described above to any of the maximum values described above, such as 0.5-40 g ai/ha, 0.8-10 g, 7-40 g ai/ha, 5-37.5 g ai/ha, 1-25 g ai/ha, 15-32.5 g ai/ha, 0.6-22.5 g ai/ha, 10-20 g ai/ha, 3-15 g ai/ha, 9-30 g ai/ha, 2-10 g ai/ha, 8-35 g ai/ha, 1-5 g ai/ha, or 0.6-37.5 g ai/ha.

Saflufenacil

Compositions and methods of the present disclosure can include saflufenacil or an agriculturally acceptable salt or ester thereof. Saflufenacil, as well as methods of preparing saflufenacil, are known in the art. Saflufenacil, shown below, is 2-chloro-5-[3,6-dihydro-3-methyl-2,6-dioxo-4-(trifluoromethyl)-1(2H)-pyrimidinyl]-4-fluoro-N-[[methyl(1-methylethyl)-amino]sulfonyl]benzamide. Its herbicidal activity is exemplified in *The Pesticide Manual*. Exemplary uses of saflufenacil include: pre-emergence control of broadleaf weeds in maize and sorghum; pre-plant foliar burn-down in soybeans, cereals, cotton, and legumes; and post-directed foliar burn-down in tree fruit and nuts.

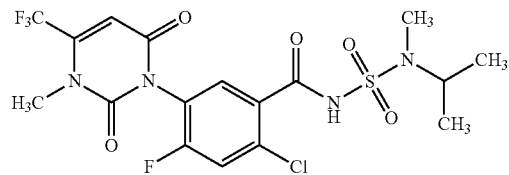 [SMILES: CC(C)N(C)S(=O)(=O)NC(=O)c1cc(-n2c(=O)cc(C(F)(F)F)n(C)c2=O)c(F)cc1Cl]

Saflufenacil can be applied to the foliage or roots of undesirable vegetation in an amount sufficient to induce a herbicidal effect. In some aspects, saflufenacil is applied to the foliage or roots of undesirable vegetation in an amount of 0.5 g ai/ha or more, such as 0.6 g ai/ha or more, 0.8 g ai/ha or more, 1 g ai/ha or more, 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 22.5 g ai/ha or more, 25 g ai/ha or more, 27.5 g ai/ha or more, 30 g ai/ha or more, 32.5 g ai/ha or more, 35 g ai/ha or more, 37.5 g ai/ha or more, 40 g ai/ha or more, 45 g ai/ha or more, 50 g ai/ha or more, 60 g ai/ha or more, 70 g ai/ha or more, or 75 g ai/ha or more; in an amount of 80 g ai/ha or less, such as 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 37.5 g ai/ha or less, 35 g ai/ha or less, 32.5 g ai/ha or less, 30 g ai/ha or less, 27.5 g ai/ha or less, 25 g ai/ha or less, 22.5 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, 2 g ai/ha or less, 1 g ai/ha or less, 0.8 g ai/ha or less, or 0.6 g ai/ha or less; or in an amount ranging from any of the minimum values described above to any of the maximum values described above, such as 0.5-80 g ai/ha, 30-75 g ai/ha, 6-70 g ai/ha, 10-65 g ai/ha, 20-50 g ai/ha, 15-80 g ai/ha, 3-45 g ai/ha, 12.5-37.5 g ai/ha, 7-35 g ai/ha, 9-32.5 g ai/ha, 1-25 g ai/ha, 8-65 g ai/ha, 4-22.5 g ai/ha, 0.5-20 g ai/ha, 0.8-17.5 g ai/ha, 22.5-55 g ai/ha, 10-40 g ai/ha, 0.5-5 g ai/ha, or 0.6-75 g ai/ha.

Sulfentrazone

Compositions and methods of the present disclosure can include sulfentrazone or an agriculturally acceptable salt or ester thereof. Sulfentrazone, as well as methods of preparing sulfentrazone, are known in the art. Sulfentrazone, shown below, is N-[2,4-dichloro-5-[4-(difluoromethyl)-4,5-dihydro-3-methyl-5-oxo-1H-1,2,4-triazol-1-yl]phenyl]-methane-sulfonamide. Its herbicidal activity is exemplified in *The Pesticide Manual*. Exemplary uses of sulfentrazone include its use for pre-plant incorporated or pre-emergence control of annual broadleaf weeds, some grass weeds, and *Cyperus* spp. in soybeans, sugar cane, and tobacco.

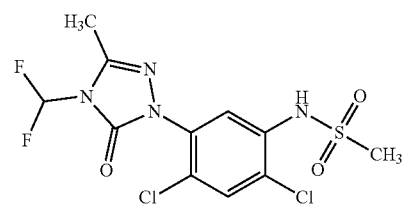 [SMILES: Cc1nn(-c2cc(NS(C)(=O)=O)c(Cl)cc2Cl)c(=O)n1C(F)F]

Sulfentrazone can be applied to the foliage and roots of undesirable vegetation in an amount sufficient to induce a herbicidal effect. In some aspects, sulfentrazone is applied to the foliage and roots of undesirable vegetation in an amount of 100 g ai/ha or more, such as 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 210 g ai/ha or more, 220 g ai/ha or more, 225 g ai/ha or more, 230 g ai/ha or more, 240 g ai/ha or more, 250 g ai/ha or more, 260 g ai/ha or more, 270 g ai/ha or more, 275 g ai/ha or more, 280 g ai/ha or more, 290 g ai/ha or more, 300 g ai/ha or more, 320 g ai/ha or more, 340 g ai/ha or more, 350 g ai/ha or more, 360 g ai/ha or more, 380 g ai/ha or more, 400 g ai/ha or more, 425 g ai/ha or more, 450 g ai/ha or more, or 475 g ai/ha or more; in an amount of 500 g ai/ha or less, such as 475 g ai/ha or less, 450 g ai/ha or less, 425 g ai/ha or less, 400 g ai/ha or less, 380 g ai/ha or less, 375 g ai/ha or less, 360 g ai/ha or less, 350 g ai/ha or less, 340 g ai/ha or less, 325 g ai/ha or less, 320 g ai/ha or less, 300 g ai/ha or less, 290 g ai/ha or less, 280 g ai/ha or less, 275 g ai/ha or less, 270 g ai/ha or less, 260 g ai/ha or less, 250 g ai/ha or less, 240 g ai/ha or less, 230 g ai/ha or less, 225 g ai/ha or less, 220 g ai/ha or less, 210 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, 110 g ai/ha or less, or 100 g ai/ha or less; or in an amount ranging from any of the minimum values described above to any of the maximum values described above, such as 100-500 g ai/ha, 250-400 g ai/ha, 120-210 g ai/ha, 375-500 g ai/ha, 200-475 g ai/ha, 360-450 g ai/ha, 120-250 g ai/ha, 110-380 g ai/ha, 125-375 g ai/ha, 170-350 g ai/ha, 220-425 g ai/ha, 150-300 g ai/ha, 120-275 g ai/ha, 160-250 g ai/ha, 280-450 g ai/ha, 130-280 g ai/ha, 110-170 g ai/ha, 120-450 g ai/ha, 100-140 g ai/ha, or 110-475 g ai/ha.

Thidiazimin

Compositions and methods of the present disclosure can include thidiazimin or an agriculturally acceptable salt or ester thereof. Thidiazimin, as well as methods of preparing thidiazimin, are known in the art. Thidiazimin, shown below, is 6-[(Z)-(6,7-dihydro-6,6-dimethyl-3H,5H-pyrrolo[2,1-c][1,2,4]thiadiazol-3-ylidene)amino]-7-fluoro-4-(2- propyn-1-yl)-2H-1,4-benzoxazin-3(4H)-one. Its herbicidal activity is exemplified in *The Pesticide Manual*. Exemplary uses of thidiazimin include its use for post-emergence control of broadleaf weeds in winter cereals, applied at 20-40 g ai/ha.

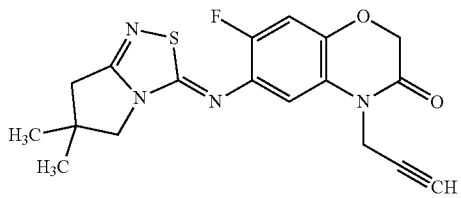 [SMILES: C#CCN1C(=O)COc2cc(F)c(/N=c3\snc4n3CC(C)(C)C4)cc21]

Thidiazimin can be applied to the foliage of undesirable vegetation in an amount sufficient to induce a herbicidal effect. In some aspects, thidiazimin thereof is applied to the foliage of undesirable vegetation in an amount of 0.5 g ai/ha or more, such as 0.6 g ai/ha or more, 0.8 g ai/ha or more, 1 g ai/ha or more, 2 g ai/ha or more, 3 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 12.5 g ai/ha or more, 15 g ai/ha or more, 17.5 g ai/ha or more, 20 g ai/ha or more, 22.5 g ai/ha or more, 25 g ai/ha or more, 27.5 g ai/ha or more, 30 g ai/ha or more, 32.5 g ai/ha or more, 35 g ai/ha or more, 37.5 g ai/ha or more, 39 g ai/ha or more, 40 g ai/ha or more, 45 g ai/ha or more, 50 g ai/ha or more, or 55 g ai/ha or more; in an amount of 60 g ai/ha or less, such as 55 g ai/ha or less, 50 g ai/ha or less, 45 g ai/ha or less, 40 g ai/ha or less, 37.5 g ai/ha or less, 35 g ai/ha or less, 32.5 g ai/ha or less, 30 g ai/ha or less, 27.5 g ai/ha or less, 25 g ai/ha or less, 22.5 g ai/ha or less, 20 g ai/ha or less, 17.5 g ai/ha or less, 15 g ai/ha or less, 12.5 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, 2 g ai/ha or less, 1 g ai/ha or less, 0.8 g ai/ha or less, or 0.6 g ai/ha or less; or in an amount ranging from any of the minimum values described above to any of the maximum values described above, such as 0.5-60 g ai/ha, 0.8-20 g ai/ha, 1-50 g ai/ha, 5-32.5 g ai/ha, 12.5-40 g ai/ha, 5-55 g ai/ha, 10-50 g ai/ha, 0.8-45 g ai/ha, 9-37.5 g ai/ha, 3-35 g ai/ha, 10-30 g ai/ha, 2-25 g ai/ha, 20-35 g ai/ha, 2-20 g ai/ha, 5-15 g ai/ha, 9-50 g ai/ha, 17.5-40 g ai/ha, or 0.6-55 g ai/ha.

Tiafenacil

Compositions and methods of the present disclosure can include tiafenacil or an agriculturally acceptable salt or ester thereof. Tiafenacil, as well as methods of preparing tiafenacil, are known in the art. Tiafenacil, shown below, is methyl N-[2-[[2-chloro-5-[3,6-dihydro-3-methyl-2,6-dioxo-4-(trifluoromethyl)-1(2H)-pyrimidinyl]-4-fluorophenyl]thio]-1-oxopropyl-ß-alaninate. Its herbicidal activity is exemplified in *The Pesticide Manual*. Exemplary uses of tiafenacil include its use for none-selective post-emergence burn down control in row crops and permanent crops.

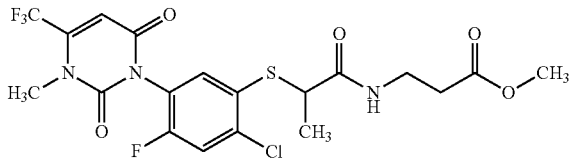

Tiafenacil can be applied to the foliage and roots of undesirable vegetation in an amount sufficient to induce a herbicidal effect. In some aspects, tiafenacil is applied to the foliage and roots of undesirable vegetation in an amount of 10 g ai/ha or more, such as 12.5 g ai/ha or more, 15 g ai/ha or more, 17.5 g ai/ha or more, 20 g ai/ha or more, 25 g ai/ha or more, 30 g ai/ha or more, 35 g ai/ha or more, 40 g ai/ha or more, 50 g ai/ha or more, 60 g ai/ha or more, or 75 g ai/ha or more, 100 g ai/ha or more, 125 g ai/ha or more, 150 g ai/ha or more, 175 g ai/ha or more, 200 g ai/ha or more, 225 g ai/ha or more, 250 g ai/ha or more, or 275 g ai/ha or more; in an amount of 300 g ai/ha or less, such as 275 g ai/ha or less, 250 g ai/ha or less, 225 g ai/ha or less, 200 g ai/ha or less, 175 g ai/ha or less, 150 g ai/ha or less, 125 g ai/ha or less, 100 g ai/ha or less, 75 g ai/ha or less, 60 g ai/ha or less, 50 g ai/ha or less, 40 g ai/ha or less, 35 g ai/ha or less, 30 g ai/ha or less, 25 g ai/ha or less, 20 g ai/ha or less, 17.5 g ai/ha or less, 15 g ai/ha or less, or 12.5 g ai/ha or less; or in an amount ranging from any of the minimum values described above to any of the maximum values described above, such as 10-300 g ai/ha, 12.5-100 g ai/ha, 40-250 g ai/ha, 275-300 g ai/ha, 10-250 g ai/ha, 50-150 g ai/ha, 175-250 g ai/ha, 17.5-225 g ai/ha, 75-200 g ai/ha, 150-250 g ai/ha, 20-175 g ai/ha, 40-150 g ai/ha, 125-150 g ai/ha, 30-200 g ai/ha, 40-125 g ai/ha, 25-100 g ai/ha, 35-275 g ai/ha, 60-150 g ai/ha, 10-75 g ai/ha, 15-70 g ai/ha, 150-225 g ai/ha, or 12.5-275 g ai/ha.

IV. Compositions

A composition comprising (a) a pyridine carboxylate herbicide or an agriculturally acceptable N-oxide, salt, or ester thereof may be mixed with or applied in combination with (b) a PROTOX inhibitor herbicide or an agriculturally acceptable salt or ester thereof.

In some aspects, (a) and (b) are used in an amount sufficient to induce an unexpectedly enhanced herbicidal effect (e.g., increased damage or injury to undesirable vegetation) while still showing good crop compatibility (e.g., no increased damage to crops or minimal increased damage or injury to crops) when compared to the individual application of the herbicidal compounds (a) or (b). In some aspects, the damage or injury to undesirable vegetation caused by the compositions and methods disclosed herein is evaluated using a scale from 0% to 100%, when compared with the untreated control vegetation, wherein 0% indicates no damage to the undesirable vegetation and 100% indicates complete destruction of the undesirable vegetation.

In some aspects, the joint action of (a) the pyridine carboxylate herbicide or an agriculturally acceptable N-oxide, salt, or ester thereof and (b) the PROTOX inhibitor herbicide or an agriculturally acceptable salt or ester thereof results in unexpectedly enhanced herbicidal effect against undesirable vegetation, even at application rates below those typically used for the herbicide to have a herbicidal effect on its own. In some aspects, the compositions and methods disclosed herein can, based on the individual components, be used at lower application rates to achieve a herbicidal effect comparable to the effect produced by the individual components at normal application rates.

In some aspects, the weight ratio of (a) the pyridine carboxylate herbicide or an agriculturally acceptable N-oxide, salt, or ester thereof (in g ae/ha) to (b) the PROTOX inhibitor herbicide or an agriculturally acceptable salt or ester thereof (in g ai/ha) can be 1:2000 or more, such as 1:1900 or more, 1:1500 or more, 1:1000 or more, 1:900 or more, 1:800 or more, 1:700 or more, 1:600 or more, 1:500 or more, 1:400 or more, 1:300 or more, 1:200 or more, 1:100 or more, 1:90 or more, 1:80 or more, 1:70 or more, 1:60 or more, 1:50 or more, 1:40 or more, 1:30 or more, 1:24 or more, 1:20 or more, 1:18 or more, 1:15 or more, 1:12 or more, 1:10 or more, 1:9 or more, 1:8 or more, 1:7 or more, 1:6 or more, 1:5 or more, 1:4 or more, 1:3 or more, 1:2 or more, 1:1.9 or more, 1:1.8 or more, 1:1.7 or more, 1:1.6 or more, 1:1.5 or more, 1:1.4 or more, 1:1.3 or more, 1:1.2 or more, 1:1.1 or more, 1:1 or more, 1.1:1 or more, 1.2:1 or more, 1.3:1 or more, 1.4:1 or more, 1.5:1 or more, 1.6:1 or more, 1.7:1 or more, 1.8:1 or more, 1.9:1 or more, 2:1 or more, 3:1 or more, 4:1 or more, 5:1 or more, 6:1 or more, 7:1 or more, 8:1 or more, 9:1 or more, 10:1 or more, 12:1 or more, 14:1 or more, 15:1 or more, 16:1 or more, 18:1 or more, 20:1 or more, 22:1 or more, 24:1 or more, 25:1 or more, 26:1 or more, 28:1 or more, 30:1 or more, 35:1 or more, 40:1 or more, 45:1 or more, 50:1 or more, 60:1 or more, 70:1 or more, 75:1 or more, 80:1 or more, 90:1 or more, 100:1 or more, 110:1 or more, 120:1 or more, 125:1 or more, 130:1 or more, 140:1 or more, 150:1 or more, 160:1 or more, 170:1 or more, 175:1 or more, 180:1 or more, 190:1 or more, 200:1 or more, 225:1 or more, 250:1 or more, 275:1 or more, 300:1 or more, 325:1 or more, 350:1 or more, 375:1 or more, 400:1 or more, 425:1 or more, 450:1 or more, 475:1 or more, 500:1 or more, 525:1 or more, 550:1 or more, 575:1 or more, or 590:1 or more; the weight ratio of (a) to (b) can be 600:1 or less, such as 590:1 or less, 575:1 or less, 550:1 or less, 525:1 or less, 500:1 or less, 475:1 or less, 450:1 or less, 425:1 or less, 400:1 or less, 375:1 or less, 350:1 or less, 325:1 or less, 300:1 or less, 275:1 or less, 250:1 or less, 225:1 or less, 200:1 or less, 190:1 or less, 180:1 or less, 175:1 or less, 170:1 or less, 160:1 or less, 150:1 or less, 140:1 or less, 130:1 or less, 125:1 or less, 120:1 or less, 110:1 or less, 100:1 or less, 90:1 or less, 80:1 or less, 75:1 or less, 70:1 or less, 60:1 or less, 50:1 or less, 45:1 or less, 40:1 or less, 35:1 or less, 30:1 or less, 28:1 or less, 26:1 or less, 25:1 or less, 24:1 or less, 22:1 or less, 20:1 or less, 18:1 or less, 16:1 or less, 15:1 or less, 14:1 or less, 12:1 or less, 10:1 or less, 9:1 or less, 8:1 or less, 7:1 or less, 6:1 or less, 5:1 or less, 4:1 or less, 3:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, 1.1:1 or less, 1:1 or less, 1:1.1 or less, 1:1.2 or less, 1:1.3 or less, 1:1.4 or less, 1:1.5 or less, 1:1.6 or less, 1:1.7 or less, 1:1.8 or less, 1:1.9 or less, 1:2 or less, 1:3 or less, 1:4 or less, 1:5 or less, 1:6 or less, 1:7 or less, 1:8 or less, 1:9 or less, 1:10 or less, 1:20 or less, 1:30 or less, 1:40 or less, 1:50 or less, 1:60 or less, 1:70 or less, 1:80 or less, 1:90 or less, 1:100 or less, 1:200 or less, 1:300 or less, 1:400 or less, 1:500 or less, 1:1000 or less, 1:1500 or less, or 1:1900 or less; or the weight ratio of (a) to (b) can range from any of the minimum ratios to any of the maximum ratios provided above, such as from 1:2000 to 600:1, from 1:700 to 100:1, from 1:40 to 90:1, from 1:10 to 16:1, from 1:14 to 10:1, from 1:8 to 1:6, or from 1:5 to 5:1.

In some aspects, the active ingredients in the compositions disclosed herein consist of (a) a pyridine carboxylate herbicide or an agriculturally acceptable N-oxide, salt, or ester thereof and (b) a PROTOX inhibitor herbicide or an agriculturally acceptable salt or ester thereof. In some aspects, the composition may include other components, such as safeners or adjuvants, but does not include a herbicidal active ingredient in addition to (a) and (b).

In some aspects, (a) and (b), independently, can be employed in a purity of from 90% to 100% (e.g., from 95% to 100%) according to nuclear magnetic resonance (NMR) spectroscopy.

V. Formulations

The present disclosure also includes formulations of the compositions and methods disclosed herein.

A. Additives

The compositions and methods disclosed herein can also be mixed with or applied with an additive. In some aspects, the additive is added sequentially. In some aspects, the additive is added simultaneously. In some aspects, the additive is premixed with the pyridine carboxylate herbicide or agriculturally acceptable N-oxide, salt, or ester thereof 1. Other Pesticides Some aspects of the described herbicidal compositions includes adding one or more additional pesticide active ingredients to the herbicidal compositions. These pesticide active ingredients may include one or more of an herbicide, an insecticide, a fungicide, a nematocide, a miticide, a arthropodicide, a bactericide, a plant growth regulator, or combinations thereof that are compatible with the compositions of the present disclosure.

In some aspects, the additive is an additional herbicide. For example, the compositions described herein can be applied in conjunction with one or more additional herbicides to control undesirable vegetation. The composition can be formulated with the one or more additional herbicides, tank mixed with the one or more additional herbicides, or applied sequentially with the one or more additional herbicides. Exemplary additional herbicides include, but are not limited to: 4-CPA; 4-CPB; 4-CPP; 2;4-D; 2;4-D choline salt; 2,4-D salts, esters and amines; 2,4-DB; 3,4-DA; 3,4-DB; 2,4-DEB; 2,4-DEP; 2,4-DP; 3,4-DP; 2,3,6-TBA; 2,4,5-T; 2,4,5-TB; acetochlor; acifluorfen; aclonifen; acrolein; alachlor; allidochlor; alloxydim; allyl alcohol; alorac; ametridione; ametryne; amibuzin; amicarbazone; amidosulfuron; aminocyclopyrachlor; 4-aminopicolinic acid based herbicides, such as halauxifen, halauxifen-methyl, florpyrauxifen, and those described in U.S. Pat. Nos. 7,314,849 and 7,432,227 to Balko, et al.; aminopyralid; amiprofos-methyl; amitrole; ammonium sulfamate; anilofos; anisuron; asulam; atraton; atrazine; azafenidin; azimsulfuron; aziprotryne; barban; BCPC; beflubutamid; benazolin; bencarbazone; benfluralin; benfuresate; bensulide; bensulfuron; benthiocarb; bentazone; benzadox; benzfendizone; benzipram; benzobicyclon; benzofenap; benzofluor; benzoylprop; benzthiazuron; bialaphos; bicyclopyrone; bifenox; bilanafos; bispyribac; borax; bromacil; bromobonil; bromobutide; bromofenoxim; bromoxynil; brompyrazon; butachlor; butafenacil; butamifos; butenachlor; buthidazole; buthiuron; butralin; butroxydim; buturon; butylate; cacodylic acid; cafenstrole; calcium chlorate; calcium cyanamide; cambendichlor; carbasulam; carbetamide; carboxazole; chlorprocarb; carfentrazone-ethyl; CDEA; CEPC; chlomethoxyfen; chloramben; chloranocryl; chlorazifop; chlorazine; chlorobromuron; chlorbufam; chloreturon; chlorfenac; chlorfenprop; chlorflurazole; chlorflurenol; chloridazon; chlorimuron; chlornitrofen; chloropon; chlorotoluron; chloroxuron; chloroxynil; chlorpropham; chlorsulfuron; chlorthal; chlorthiamid; cinidon-ethyl; cinmethylin; cinosulfuron; cisanilide; clacyfos; clethodim; cliodinate; clodinafop-propargyl; clofop; clomazone; clomeprop; cloprop; cloproxydim; clopyralid; cloransulam-methyl; CMA; copper sulfate; CPMF; CPPC; credazine; cresol; cumyluron; cyanatryn; cyanazine; cycloate; cyclopyrimorate; cyclosulfamuron; cycloxydim; cycluron; cyhalofop-butyl; cyperquat; cyprazine; cyprazole; cypromid; daimuron; dalapon; dazomet; delachlor; desmedipham; desmetryn; di-allate; dicamba; dichlobenil; dichloralurea; dichlormate; dichlorprop; dichlorprop-P; diclofop-methyl; diclosulam; diethamquat; diethatyl; difenopenten; difenoxuron; difenzoquat; diflufenican; diflufenzopyr; dimefuron; dimepiperate; dimethachlor; dimethametryn; dimethenamid; dimethenamid-P; dimexano; dimidazon; dinitramine; dinofenate; dinoprop; dinosam; dinoseb; dinoterb; diphenamid; dipropetryn; diquat; disul; dithiopyr; diuron; DMPA; DNOC; DSMA; EBEP; eglinazine; endothal; epronaz; EPTC; erbon; esprocarb; ethalfluralin; ethametsulfuron; ethbenzamide; ethametsulfuron; ethidimuron; ethiolate; ethobenzamid; ethofumesate; ethoxyfen; ethoxysulfuron; etinofen; etnipromid; etobenzanid; EXD; fenasulam; fenoprop; fenoxaprop; fenoxaprop-P-ethyl; fenoxaprop-P-ethyl+isoxadifen-ethyl; fenoxasulfone; fenquinotrione; fenteracol; fenthiaprop; fentrazamide; fenuron; ferrous sulfate; flamprop; flamprop-M; flazasulfuron; florasulam; fluazifop; fluazifop-P-butyl; fluazolate; flucarbazone; flucetosulfuron; fluchloralin; flufenacet; flufenican; flufenpyr-ethyl; flumetsulam; flumezin; flumiclorac-pentyl; flumioxazin; flumipropyn; fluometuron; fluorodifen; fluoroglycofen; fluoromidine; fluoronitrofen; fluothiuron; flupoxam; flupropacil; flupropanate; flupyrsulfuron; fluridone; flurochloridone; fluroxypyr; fluroxypyr-meptyl; flurtamone; fluthiacet; fomesafen; foramsulfuron; fosamine; fumiclorac; furyloxyfen; glufosinate; glufosinate-ammonium; glufosinate-P-ammonium; glyphosate salts and esters; halosafen; halosulfuron; haloxydine; haloxyfop; hexachloroacetone; hexaflurate; hexazinone; imazamethabenz; imazamox; imazapic; imazapyr; imazaquin; imazethapyr; imazosulfuron; indanofan; indaziflam; iodobonil; iodomethane; iodosulfuron; iodosulfuron-ethyl-sodium; iofensulfuron; ioxynil; ipazine; ipfencarbazone; iprymidam; isocarbamid; isocil; isomethiozin; isonoruron; isopolinate; isopropalin; isoproturon; isouron; isoxaben; isoxachlortole; isoxaflutole; isoxapyrifop; karbutilate; ketospiradox; lactofen; lenacil; linuron; MAA; MAMA; MCPA esters and amines; MCPA-thioethyl; MCPB; mecoprop; mecoprop-P; medinoterb; mefenacet; mefluidide; mesoprazine; mesosulfuron; mesotrione; metam; metamifop; metamitron; metazachlor; metflurazon; methabenzthiazuron; methalpropalin; methazole; methiobencarb; methiozolin; methiuron; methometon; methoprotryne; methyl bromide; methyl isothiocyanate; methyldymron; metobenzuron; metobromuron; metolachlor; metosulam; metoxuron; metribuzin; metsulfuron; molinate; monalide; monisouron; monochloroacetic acid; monolinuron; monuron; morfamquat; MSMA; naproanilide; napropamide; napropamide-M; naptalam; neburon; nicosulfuron; nipyraclofen; nitralin; nitrofen; nitrofluorfen; norflurazon; noruron; OCH; orbencarb; ortho-dichlorobenzene; orthosulfamuron; oryzalin; oxadiargyl; oxadiazon; oxapyrazon; oxasulfuron; oxaziclomefone; oxyfluorfen; paraflufen-ethyl; parafluron; paraquat; pebulate; pelargonic acid; pendimethalin; penoxsulam; pentachlorophenol; pentanochlor; pentoxazone; perfluidone; pethoxamid; phenisopham; phenmedipham; phenmedipham-ethyl; phenobenzuron; phenylmercury acetate; picloram; picolinafen; pinoxaden; piperophos; potassium arsenite; potassium azide; potassium cyanate; pretilachlor; primisulfuron; procyazine; prodiamine; profluazol; profluralin; profoxydim; proglinazine; prohexadione-calcium; prometon; prometryne; pronamide; propachlor; propanil; propaquizafop; propazine; propham; propisochlor; propoxycarbazone; propyrisulfuron; propyzamide; prosulfalin; prosulfocarb; prosulfuron; proxan; prynachlor; pydanon; pyraclonil; pyraflufen; pyrasulfotole; pyrazogyl; pyrazone; pyrazolynate; pyrazosulfuron; pyrazoxyfen; pyribenzoxim; pyributicarb; pyriclor; pyridafol; pyridate; pyriftalid; pyriminobac; pyrimisulfan; pyrithiobac-sodium; pyroxasulfone; pyroxsulam; quinclorac; quinmerac; quinoclamine; quinonamid; quizalofop; quizalofop-P-ethyl; quizalofop-P-tefuryl; rhodethanil; rimsulfuron; saflufenacil; S-metolachlor; sebuthylazine; secbumeton; sethoxydim; siduron; simazine; simeton; simetryn; SMA; sodium arsenite; sodium azide; sodium chlorate; sulcotrione; sulfallate; sulfentrazone; sulfometuron; sulfosate; sulfosulfuron; sulfuric acid; sulglycapin; swep; TCA; tebutam; tebuthiuron; tefuryltrione; tembotrione; tepraloxydim; terbacil; terbucarb; terbuchlor; terbumeton; terbuthylazine; terbutryne; tetrafluron; thenylchlor; thiameturon; thiazafluron; thiazopyr; thidiazimin; thidiazuron; thiencarbazone; thifensulfuron; thiobencarb; tiafenacil; tiocarbazil; tioclorim; tolpyralate; topramezone; tralkoxydim; tri-allate; triafamone; triasulfuron; triaziflam; tribenuron; tribenuron; tricamba; triclopyr choline salt; triclopyr esters and amines; tridiphane; trietazine; trifloxysulfuron; trifludimoxazin; trifluralin; triflusulfuron; trifop; trifopsime; trihydroxytriazine; trimeturon; tripropindan; tritac; tritosulfuron; vernolate; xylachlor; and salts, esters, optically active isomers, and mixtures thereof.

In some aspects, the additional pesticide or an agriculturally acceptable salt or ester thereof is provided in a premixed formulation with (a), (b), or combinations thereof. In some aspects, the pyridine carboxylate herbicide or an agriculturally acceptable N-oxide, salt, or ester thereof is provided in a premixed formulation with an additional pesticide. In some aspects, the PROTOX inhibitor herbicide or an agriculturally acceptable salt or ester thereof is provided in a premixed formulation with an additional pesticide.

In some aspects, the compositions may include one or more herbicidal active ingredients in addition to (a) and (b). In some aspects, the compositions do not include an herbicidal active ingredient in addition to (a) and (b). In some aspects, the compositions may exclude one or more herbicidal active ingredients specified above. In some aspects, the compositions may include one or more herbicidal active ingredients in addition to (a), but may exclude one or more herbicidal ingredients specified above.

2. Adjuvants

In some aspects, the additive includes an agriculturally acceptable adjuvant. Exemplary agriculturally acceptable adjuvants include, but are not limited to, antifreeze agents, antifoam agents, compatibilizing agents, sequestering agents, neutralizing agents and buffers, corrosion inhibitors, colorants, odorants, penetration aids, wetting agents, spreading agents, dispersing agents, thickening agents, freeze point depressants, antimicrobial agents, crop oil, adhesives (for instance, for use in seed formulations), surfactants, protective colloids, emulsifiers, tackifiers, and mixtures thereof.

Exemplary agriculturally acceptable adjuvants include, but are not limited to, crop oil concentrates (e.g., 85% mineral oil+15% emulsifiers); nonylphenol ethoxylates; benzylcocoalkyldimethyl quaternary ammonium salts; blends of petroleum hydrocarbon, alkyl esters, organic acids, and anionic surfactants; $C_9$-$C_{11}$ alkylpolyglycoside; phosphate alcohol ethoxylates; natural primary alcohol ($C_{12}$-$C_{16}$) ethoxylate; di-sec-butylphenol EO-PO block copolymers; polysiloxane-methyl cap; nonylphenol ethoxylate+urea ammonium nitrates; emulsified methylated seed oils; tridecyl alcohol (synthetic) ethoxylates (e.g., 8 EO); tallow amine ethoxylates (e.g., 15 EO); and PEG(400) dioleate-99.

Exemplary surfactants (e.g., wetting agents, tackifiers, dispersants, emulsifiers) include, but are not limited to: the alkali metal salts, alkaline earth metal salts and ammonium salts of fatty acids or of aromatic sulfonic acids (e.g., lignosulfonic acids, phenolsulfonic acids, naphthalenesulfonic acids, and dibutylnaphthalenesulfonic acid); alkyl- and alkylarylsulfonates; alkyl sulfates, lauryl ether sulfates and fatty alcohol sulfates; salts of sulfated hexa-, hepta- and octadecanols; salts of fatty alcohol glycol ethers; condensates of sulfonated naphthalene and its derivatives with formaldehyde; condensates of naphthalene or of the naphthalene sulfonic acids with phenol and formaldehyde; polyoxyethylene octylphenol ether; ethoxylated isooctyl-, octyl- or nonylphenol, alkylphenyl or tributylphenyl polyglycol ether; alkyl aryl polyether alcohols; isotridecyl alcohol; fatty alcohol/ethylene oxide condensates; ethoxylated castor oil; polyoxyethylene alkyl ethers or polyoxypropylene alkyl ethers; lauryl alcohol polyglycol ether acetate; sorbitol esters; lignosulfite waste liquors and proteins; denatured proteins, polysaccharides (e.g., methylcellulose); hydrophobically modified starches; and polyvinyl alcohol, polycarboxylates, polyalkoxylates, polyvinyl amines, polyethyleneimine, polyvinylpyrrolidone, and copolymers thereof.

Exemplary thickeners include, but are not limited to, polysaccharides (e.g., xanthan gum), organic and inorganic sheet minerals, and mixtures thereof.

Exemplary antifoam agents include, but are not limited to, silicone emulsions, long-chain alcohols, fatty acids, fatty acid salts, organofluorine compounds, and mixtures thereof.

Exemplary antimicrobial agents include, but are not limited to: bactericides based on dichlorophen and benzyl alcohol hemiformal; isothiazolinone derivatives, such as alkylisothiazolinones and benzisothiazolinones; and mixtures thereof.

Exemplary antifreeze agents, include, but are not limited to ethylene glycol, propylene glycol, urea, glycerol, and mixtures thereof.

Exemplary colorants include, but are not limited to, the dyes known under the names Rhodamine B, pigment blue 15:4, pigment blue 15:3, pigment blue 15:2, pigment blue 15:1, pigment blue 80, pigment yellow 1, pigment yellow 13, pigment red 112, pigment red 48:2, pigment red 48:1, pigment red 57:1, pigment red 53:1, pigment orange 43, pigment orange 34, pigment orange 5, pigment green 36, pigment green 7, pigment white 6, pigment brown 25, basic violet 10, basic violet 49, acid red 51, acid red 52, acid red 14, acid blue 9, acid yellow 23, basic red 10, basic red 108, and mixtures thereof.

Exemplary adhesives include, but are not limited to, polyvinylpyrrolidone, polyvinyl acetate, polyvinyl alcohol, tylose, and mixtures thereof 3. Safeners In some aspects, the additive is a safener. Safeners are compounds leading to better crop plant compatibility when applied with a herbicide. In some aspects, the safener itself is herbicidally active. In some aspects, the safener acts as an antidote or antagonist in the crop plants and can protect the crop plants from damage that might otherwise occur from an applied herbicide. Exemplary safeners include, but are not limited to, AD-67 (MON 4660), benoxacor, benthiocarb, brassinolide, cloquintocet, cloquintocet-mexyl, cyometrinil, cyprosulfamide, daimuron, dichlormid, dicyclonon, dietholate, dimepiperate, disulfoton, fenchlorazole, fenchlorazole-ethyl, fenclorim, flurazole, fluxofenim, furilazole, harpin proteins, isoxadifen-ethyl, jiecaowan, jiecaoxi, mefenpyr, mefenpyr-diethyl, mephenate, naphthalic anhydride, 2,2,5-trimethyl-3-(dichloroacetyl)-1,3-oxazolidine, 4-(dichloroacetyl)-1-oxa-4-azaspiro [4.5]-decane, oxabetrinil, R29148, and N-phenyl-sulfonylbenzoic acid amides, as well as thereof agriculturally acceptable salts and, provided they have a carboxyl group, their agriculturally acceptable derivatives. In some aspects, the safener can be cloquintocet or an ester or salt thereof, such as cloquintocet-mexyl. In some aspects, the safener can be mefenpyr or an ester or salt thereof, such as mefenpyr-diethyl. In some aspects, the safener is employed in rice, cereal, or maize. For example, mefenpyr or cloquintocet can be used to antagonize harmful effects of the compositions on rice, row crops, and cereals.

4. Carriers

In some aspects, the additive includes a carrier. In some aspects, the additive includes a liquid or solid carrier. In some aspects, the additive includes an organic or inorganic carrier. Exemplary liquid carriers include, but are not limited to: water; petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like; toluene; xylene; petroleum naphtha; crop oil; acetone; methyl ethyl ketone; cyclohexanone; trichloroethylene; perchloroethylene; ethyl acetate; amyl acetate; butyl acetate; propylene glycol monomethyl ether and diethylene glycol monomethyl ether; methyl alcohol; ethyl alcohol; isopropyl alcohol; amyl alcohol; ethylene glycol; propylene glycol; glycerin; N-methyl-2-pyrrolidinone; N,N-dimethyl alkylamides; dimethyl sulfoxide; and liquid fertilizers, as well as mixtures thereof. Exemplary solid carriers include, but are not limited to: silicas, silica gels, silicates, talc, kaolin, limestone, lime, chalk, bole, loess, clay, dolomite, diatomaceous earth, calcium sulfate, magnesium sulfate, magnesium oxide, ground synthetic materials, pyrophyllite clay, attapulgus clay, kieselguhr, calcium carbonate, bentonite clay, Fuller's earth, cottonseed hulls, wheat flour, soybean flour, pumice, wood flour, walnut shell flour, lignin, ammonium sulfate, ammonium phosphate, ammonium nitrate, ureas, cereal meal, tree bark meal, wood meal and nutshell meal, cellulose powders, and mixtures thereof.

B. Physical States

In some aspects, the formulation of (a) the pyridine carboxylate herbicide or an agriculturally acceptable N-oxide, salt, or ester thereof and (b) the PROTOX inhibitor herbicide or an agriculturally acceptable salt or ester thereof may be present in suspended, emulsified, dissolved, or solid form. Exemplary formulations include, but are not limited to, aqueous solutions, aqueous suspensions, aqueous dispersions, aqueous emulsions, aqueous microemulsions, aqueous suspo-emulsions, oil solutions, oil suspensions, oil dispersions, oil emulsions, oil microemulsions, oil suspo-emulsions, self-emulsifying formulations, pastes, powders, dusts, granules, and materials for spreading.

In some aspects, (a) and (b) is in an aqueous solution that can be diluted before use. In various aspects, (a) and (b) may be provided as a high-strength formulation such as a concentrate. In some aspects, the concentrate is stable and retains potency during storage and shipping. In various aspects, the concentrate is a clear, homogeneous liquid that is stable at temperatures of 54° C. or greater. In some aspects, the concentrate does not exhibit any precipitation of solids at temperatures of −10° C. or higher. In some aspects, the concentrate does not exhibit separation, precipitation, or crystallization of any components at low temperatures. For example, the concentrate remains a clear solution at temperatures below 0° C. (e.g., below −5° C., below −10° C., below −15° C.). In some aspects, the concentrate exhibits a viscosity of less than 50 centipoise (50 megapascals), even at temperatures as low as 5° C. In some aspects, the concentrate does not exhibit separation, precipitation, or crystallization of any components during storage for a period of 2 weeks or greater (e.g., 4 weeks, 6 weeks, 8 weeks, 3 months, 6 months, 9 months, or 12 months or greater).

In some aspects, emulsions, pastes, or oil dispersions can be prepared by homogenizing (a) and (b) in water with a wetting agent, tackifier, dispersant, or emulsifier. In some aspects, concentrates suitable for dilution with water can be prepared, comprising (a), (b), a wetting agent, a tackifier, and a dispersant or emulsifier.

In some aspects, powders, materials for spreading, or dusts can be prepared by mixing or concomitant grinding of (a) and (b) and optionally other additives with a solid carrier.

In some aspects, granules (e.g., coated granules, impregnated granules and homogeneous granules) can be prepared by binding the (a) and (b) to solid carriers.

In some aspects, the formulations comprise, by total weight of (a) and (b), from 1% to 99% of (a) and 1% to 99% of (b) (e.g., 95% of (a) and 5% of (b); 70% of (a) and 30% of (b); or 40% of (a) and 60% of (b)). In formulations designed to be employed as concentrates, the total amount of (a) and (b) can be present in a concentration of from about 0.1 to about 98 weight percent (wt. %), based on the total weight of the formulation. For example, the total amount of (a) and (b) can be present in a concentration as little as about 1 wt. %, about 2.5 wt. %, about 5 wt. %, about 7.5 wt. %, about 10 wt. %, about 15 wt. %, about 20 wt. %, about 25 wt. %, about 30 wt. %, about 35 wt. %, about 40 wt. %, about 45 wt. %, as high as about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 97 wt. %, or within any range defined between any two of the forgoing values, such as between about 1 wt. % to about 97 wt. %, between about 10 wt. % to about 90 wt. %, between about 20 wt. % to about 45 wt. %, and about 25 wt. % to about 50 wt. % based on the total weight of the formulation. Concentrates can be diluted with an inert carrier, such as water, prior to application. The diluted formulations applied to undesirable vegetation or the locus of undesirable vegetation can contain from 0.0006 to 8.0 wt. % of the total amount of (a) and (b) (e.g., from 0.001 to 5.0 wt. %), based on the total weight of the diluted formulation.

C. Packaging

In some aspects, the formulation can be in the form of a single package formulation including both: (a) the pyridine carboxylate herbicide or an agriculturally acceptable N-oxide, salt, or ester thereof; and (b) the PROTOX inhibitor herbicide or an agriculturally acceptable salt or ester thereof. In some aspects, the formulation can be in the form of a single package formulation including both (a) and (b) and further including at least one additive. In some aspects, the formulation can be in the form of a multi-package formulation, such as a two-package formulation, wherein one package contains (a) and optionally at least one additive while the other package contains (b) and optionally at least one additive. In some aspects of the two-package formulation, the formulation including (a) and optionally at least one additive and the formulation including (b) and optionally at least one additive are mixed before application and then applied simultaneously. In some aspects, the mixing is performed as a tank mix (e.g., the formulations are mixed immediately before or upon dilution with water). In some aspects, the formulation including (a) and the formulation including (b) are not mixed but are applied sequentially (in succession), for example, immediately or within 1 hour, within 2 hours, within 4 hours, within 8 hours, within 16 hours, within 24 hours, within 2 days, or within 3 days, of each other.

VI. Methods of Use

The compositions disclosed herein can be applied in any known technique for applying herbicides. Exemplary application techniques include, but are not limited to, spraying, atomizing, dusting, spreading, or direct application into water. The method of application can vary depending on the intended purpose. In some aspects, the method of application can be chosen to ensure the finest possible distribution of the compositions disclosed herein.

In some aspects, a method of controlling undesirable vegetation which comprises contacting the vegetation or the locus thereof with or applying to the soil or water to prevent the emergence or growth of vegetation any of the compositions is disclosed herein.

The compositions disclosed herein can be applied pre-emergence (before the emergence of undesirable vegetation) or post-emergence (e.g., during and/or after emergence of the undesirable vegetation). In some aspects, the composition is applied post-emergence to the undesirable vegetation. In some aspects, the pyridine carboxylate herbicide and PROTOX inhibitor herbicide are applied simultaneously. In some aspects, the pyridine carboxylate herbicide and PROTOX inhibitor herbicide are applied sequentially, for example, immediately or with minimal delay, within about 10 minutes, within about 20 minutes, within about 30 minutes, within about 40 minutes, within about 1 hour, within about 2 hours, within about 4 hours, within about 8 hours, within about 16 hours, within about 24 hours, within about 2 days, or within about 3 days, of each other.

When the compositions are used in crops, the compositions can be applied after seeding and before or after the emergence of the crop plants. In some aspects, the compositions disclosed herein show good crop tolerance even when the crop has already emerged and can be applied during or after the emergence of the crop plants. In some aspects, when the compositions are used in crops, the compositions can be applied before seeding of the crop plants.

In some aspects, the compositions disclosed herein are applied to vegetation or an area adjacent the vegetation or applying to soil or water to prevent the emergence or growth of vegetation by spraying (e.g., foliar spraying). In some aspects, the spraying techniques use, for example, water as carrier and spray volume rates of from 2 liters per hectare (L/ha) to 2000 L/ha (e.g., from 10-1000 L/ha or from 50-500 L/ha). In some aspects, the compositions disclosed herein are applied by the low-volume or the ultra-low-volume method, wherein the application is in the form of micro granules. In some aspects, wherein the compositions disclosed herein are less well tolerated by certain crop plants, the compositions can be applied with the aid of the spray apparatus in such a way that they come into little contact, if any, with the leaves of the sensitive crop plants while reaching the leaves of undesirable vegetation that grows underneath or on the bare soil (e.g., post-directed or lay-by).

In some aspects, the compositions disclosed herein can be applied as dry formulations (e.g., granules, powders, or dusts).

In some aspects, wherein the undesirable vegetation is treated post-emergence, the compositions disclosed herein are applied by foliar application. In some aspects, herbicidal activity is exhibited by the compounds of the mixture when they are applied directly to the plant or to the locus of the plant at any stage of growth or before planting or emergence. The effect observed can depend upon the type of undesirable vegetation to be controlled, the stage of growth of the undesirable vegetation, the application parameters of dilution and spray drop size, the particle size of solid components, the environmental conditions at the time of use, the specific compound employed, the specific adjuvants and carriers employed, the soil type, and the like, as well as the amount of chemical applied. In some aspects, these and other factors can be adjusted to promote non-selective or selective herbicidal action.

The compositions and methods disclosed herein can be used to control undesirable vegetation in a variety of applications. The compositions and methods disclosed herein can be used for controlling undesirable vegetation in areas including, but not limited to, farmland, turfgrass, pastures, grasslands, rangelands, fallow land, rights-of-way, aquatic settings, tree and vine, wildlife management areas, or rangeland. In some aspects, the undesirable vegetation is controlled in a row crop. Exemplary crops include, but are not limited to, wheat, barley, triticale, rye, teff, oats, maize, cotton, soy, sorghum, rice, millet, sugarcane and range land (e.g., pasture grasses). In some aspects, the compositions and methods disclosed herein can be used for controlling undesirable vegetation in maize, wheat, barley, rice, sorghum, millet, oats, or combinations thereof. In some aspects, the compositions and methods disclosed herein can be used for controlling undesirable vegetation in broadleaf crops. In some aspects, the compositions and methods disclosed herein can be used for controlling undesirable vegetation in canola, flax, sunflower, soy, or cotton. In some aspects, the compositions and methods disclosed herein can be used in industrial vegetation management (IVM) or for utility, pipeline, roadside, and railroad rights-of-way applications. In some aspects, the compositions and methods disclosed herein can also be used in forestry (e.g., for site preparation or for combating undesirable vegetation in plantation forests). In some aspects, the compositions and methods disclosed herein can be used to control undesirable vegetation in conservation reserve program lands (CRP), trees, vines, grasslands, and grasses grown for seeds. In some aspects, the compositions and methods disclosed herein can be used on lawns (e.g., residential, industrial, and institutional), golf courses, parks, cemeteries, athletic fields, and sod farms.

The compositions and methods disclosed herein can also be used in crop plants that are resistant to, for instance, herbicides, pathogens, and/or insects. In some aspects, the compositions and methods disclosed herein can be used in crop plants that are resistant to one or more herbicides because of genetic engineering or breeding. In some aspects, the compositions and methods disclosed herein can be used in crop plants that are resistant to one or more pathogens such as plant pathogenic fungi owing to genetic engineering or breeding. In some aspects, the compositions and methods disclosed herein can be used in crop plants that are resistant to attack by insects owing to genetic engineering or breeding. Exemplary resistant crops include, but are not limited to, crops that are resistant to photosystem II inhibitors, or crop plants that, owing to introduction of the gene for *Bacillus thuringiensis* (or Bt) toxin by genetic modification, are resistant to attack by certain insects. In some aspects, the compositions and methods described herein can be used in conjunction with glyphosate, glufosinate, dicamba, phenoxy auxins, pyridyloxy auxins, aryloxyphenoxypropionates, acetyl CoA carboxylase (ACCase) inhibitors, imidazolinones, acetolactate synthase (ALS) inhibitors, 4-hydroxyphenyl-pyruvate dioxygenase (HPPD) inhibitors, protoporphyrinogen oxidase (PROTOX) inhibitors, triazines, and bromoxynil to control vegetation in crops tolerant to glyphosate, glufosinate, dicamba, phenoxy auxins, pyridyloxy auxins, aryloxyphenoxypropionates, ACCase inhibitors, imidazolinones, synthetic auxin herbicide, HPPD inhibitors, PROTOX inhibitors, triazines, bromoxynil, or combinations thereof. In some aspects, the undesirable vegetation is controlled in glyphosate, glufosinate, dicamba, phenoxy auxins, pyridyloxy auxins, aryloxyphenoxypropionates, ACCase inhibitors, synthetic auxin herbicide, HPPD inhibitors, PROTOX inhibitors, triazines, and bromoxynil tolerant crops possessing single, multiple or stacked traits conferring tolerance to single or multiple chemistries and/or multiple modes of action. In some aspects, the undesirable vegetation can be controlled in a crop that is ACCase-tolerant, ALS-tolerant, or a combination thereof. The combination of (a) and (b) can be used in combination with one or more herbicides that are selective for the crop being treated and which complement the spectrum of weeds controlled by these compounds at the application rate employed. In some aspects, the compositions described herein and other complementary herbicides are applied at the same time, either as a combination formulation or as a tank mix, or as sequential applications. The compositions and methods may be used in controlling undesirable vegetation in crops possessing agronomic stress tolerance (including but not limited to drought, cold, heat, salt, water, nutrient, fertility, pH), pest tolerance (including but not limited to insects, fungi and pathogens), and crop improvement traits (including but not limited to yield; protein, carbohydrate, or oil content; protein, carbohydrate, or oil composition; plant stature and plant architecture).

In some aspects, the compositions disclosed herein can be used for controlling undesirable vegetation including grasses, broadleaf weeds, sedge weeds, and combinations thereof. In some aspects, the compositions disclosed herein can be used for controlling undesirable vegetation including, but not limited to, *Polygonum* species, *Amaranthus* species, *Chenopodium* species, *Sida* species, *Ambrosia* species, *Cyperus* species, *Setaria* species, *Sorghum* species, *Acanthospermum* species, *Anthemis* species, *Atriplex* species, *Brassica* species, *Cirsium* species, *Convolvulus* species, *Conyza* species, *Cassia* species, *Commelina* species, *Datura* species, *Euphorbia* species, Geranium species, *Galinsoga* species, *Ipomea* species, *Lamium* species, *Lolium* species, *Malva* species, *Matricaria* species, *Prosopis* species, *Rumex* species, *Sisymbrium* species, *Solanum* species, *Trifolium* species, *Xanthium* species, *Veronica* species, and Viola species. In some aspects, the undesired vegetation includes common chickweed (*Stellaria media*), velvetleaf (*Abutilon theophrasti*), hemp sesbania (*Sesbania exaltata* Cory), *Anoda cristata, Bidens pilosa, Brassica kaber,* shepherd's purse (*Capsella bursa-pastoris*), cornflower (*Centaurea cyanus* or *Cyanus segetum*), hempnettle (*Galeopsis tetrahit*), cleavers (*Galium aparine*), common sunflower (*Helianthus annuus*), *Desmodium tortuosum,* Italian ryegrass (*Lolium multijlorum*), kochia (*Kochia scoparia*), *Medicago arabica, Mercurialis annua, Myosotis arvensis,* common poppy (*Papaver rhoeas*), *Raphanus raphanistrum,* broad-leaf dock (*Rumex obtusifolius*), Russian thistle (*Salsola kali*), wild mustard (*Sinapis arvensis*), *Sonchus arvensis, Thlaspi arvense, Tagetes minuta, Richardia brasiliensis, Plantago major, Plantago lanceolata*, bird's-eye speedwell (*Veronica persica*), pigweed (*Amaranthus retroflexus*), winter rape (*Brassica napus*), lambsquarters (*Chenopodium album*), Canadian thistle (*Cirsium arvense*), nutsedge (*Cyperus esculentus*), poinsettia (*Euphorbia heterophylla*), prickly lettuce (*Lactuca serriola*), purple deadnettle (*Lamium purpureum*), wild chamomile (*Matricaria chamomilla*), false chamomile (*Matricaria inodora*), field chamomile (*Anthemis arvensis*), common buckwheat (*Fagopyrum esculentum*), wild buckwheat (*Polygonum convulvus*), giant foxtail (*Setaria faberi*), green foxtail (*Setaria viridis*), common sorghum (*Sorghum vulgare*), wild pansy (Viola tricolor), or combinations thereof.

The compositions described herein can be used to control herbicide resistant or tolerant weeds. The methods employing the compositions described herein may also be employed to control herbicide resistant or tolerant weeds. Exemplary resistant or tolerant weeds include, but are not limited to, biotypes resistant or tolerant to acetolactate synthase (ALS) or acetohydroxy acid synthase (AHAS) inhibitors (e.g., imidazolinones, sulfonylureas, pyrimidinylthiobenzoates, triazolopyrimidines, sulfonylaminocarbonyltriazolinones), photosystem II inhibitors (e.g., phenylcarbamates, pyridazinones, triazines, triazinones, uracils, amides, ureas, benzothiadiazinones, nitriles, phenylpyridazines), acetyl CoA carboxylase (ACCase) inhibitors (e.g., aryloxyphenoxypropionates, cyclohexanediones, phenylpyrazolines), synthetic auxins (e.g., benzoic acids, phenoxycarboxylic acids, pyridine carboxylates, quinoline carboxylic acids), auxin transport inhibitors (e.g., phthalamates, semicarbazones), photosystem I inhibitors (e.g., bipyridyliums), 5-enolpyruvylshikimate-3-phosphate (EPSP) synthase inhibitors (e.g., glyphosate), glutamine synthetase inhibitors (e.g., glufosinate, bilanafos), microtubule assembly inhibitors (e.g., benzamides, benzoic acids, dinitroanilines, phosphoramidates, pyridines), mitosis inhibitors (e.g., carbamates), very long chain fatty acid (VLCFA) inhibitors (e.g., acetamides, chloroacetamides, oxyacetamides, tetrazolinones), fatty acid and lipid synthesis inhibitors (e.g., phosphorodithioates, thiocarbamates, benzofuranes, chlorocarbonic acids), protoporphyrinogen oxidase (PROTOX) inhibitors (e.g., diphenylethers, N-phenylphthalimides, oxadiazoles, oxazolidinediones, phenylpyrazoles, pyrimidindiones, thiadiazoles, triazolinones), carotenoid biosynthesis inhibitors (e.g., clomazone, amitrole, aclonifen), phytoene desaturase (PDS) inhibitors (e.g., amides, anilidex, furanones, phenoxybutan-amides, pyridiazinones, pyridines), 4-hydroxyphenyl-pyruvate-dioxygenase (HPPD) inhibitors (e.g., callistemones, isoxazoles, pyrazoles, triketones), cellulose biosynthesis inhibitors (e.g., nitriles, benzamides, quinclorac, triazolocarboxamides), herbicides with multiple modes of action such as quinclorac, and unclassified herbicides such as arylaminopropionic acids, difenzoquat, endothall, and organoarsenicals. Exemplary resistant or tolerant weeds include, but are not limited to, biotypes with resistance or tolerance to multiple herbicides, biotypes with resistance or tolerance to multiple chemical classes, biotypes with resistance or tolerance to multiple herbicide modes of action, and biotypes with multiple resistance or tolerance mechanisms (e.g., target site resistance or metabolic resistance).

By way of non-limiting illustration, examples of some aspects of the present disclosure are given below. Parts and percentages are on a per weight basis unless otherwise indicated.

EXAMPLES

Greenhouse Trial Methodology—Evaluation of Postemergence Herbicidal Effect

Seeds of the desired test plant species were planted in a 90:10% v/v (volume/volume) mixture of PRO-MIX® BX (Premier Tech Horticulture, Quakertown, Pa., USA) and PROFILE® GREENS GRADE™ (Profile Products LLC, Buffalo Grove, Ill., USA) planting mixture, which typically has a pH of 5.2 to 6.2 and an organic matter content of at least 50 percent, in plastic pots with a surface area of 103.2 square centimeters ($cm^2$). In some aspects or embodiments, to help ensure good germination and healthy plants, a fungicide treatment and/or other chemical or physical treatment was applied. The plants were grown for 7-36 days (d) in a greenhouse with an approximate 14-hour (h) photoperiod which was maintained at about 23° C. during the day and 22° C. during the night. Nutrients and water were added on a regular basis and supplemental lighting was provided with overhead metal halide 1000-Watt lamps as necessary. The plants were employed for testing when they reached the second or third true leaf stage.

Emulsifiable concentrates of each of each pyridine carboxylate herbicide (Compound A or Compound B) were prepared at 100 grams acid equivalent per liter (g ae/L). The emulsifiable concentrates also included a safener, cloquintocet mexyl, at 120 grams active ingredient per liter (g ai/L). An aliquot of each emulsifiable concentrate was placed in a 25 mL glass vial and diluted with an aqueous mixture of 1.25% (v/v) ACTIROB® B esterified rapeseed oil (Bayer Crop Science, Research Triangle Park, N.C., USA) or MSO® Concentrate with LECI-TECH® methylated soybean oil (Loveland Products, Loveland, Colo., USA) to obtain concentrated stock solutions at the highest application rate for each herbicide, based upon a 12 milliliter (mL) application volume at a rate of 187 liters per hectare (L/ha). The concentrated stock solutions were further diluted with an aqueous mixture of 1.25% v/v ACTIROB® B or MSO® Concentrate with LECI-TECH® to obtain stock solutions at reduced application rates for each herbicide. Spray solutions of the herbicide combinations (Compound A or Compound B plus PROTOX inhibitor herbicide) were prepared by adding weighed amounts or aliquots of the PROTOX inhibitor herbicides to the stock solutions of Compound A or Compound B to form 12-mL spray solutions in two-way combinations.

The spray solutions were applied to the plant material with an overhead Mandel track sprayer equipped with 8002E nozzles calibrated to deliver 187 L/ha over an application area of 0.503 square meters ($m^2$) at a spray height of 18 inches (43 centimeters (cm)) above the average plant canopy. Control plants were sprayed in the same manner with the solvent blank. All pyridine carboxylate herbicide (component a) application rates are given as "g ae/ha" and all PROTOX inhibitor herbicide (component b) application rates are given as "g ai/ha."

The treated plants and control plants were placed in a greenhouse as described above and watered by sub-irrigation to prevent wash-off of the test compounds. After 20-22 d, the condition of the test plants as compared with that of the control plants was determined visually and scored on a scale of 0 to 100 percent where 0 corresponds to no injury and 100 corresponds to complete kill.

The details of the compositions and the crops tested are specified in the following Examples.

Example 1

Compositions comprising Compound A and bifenox were tested on undesirable vegetation species, including broad-leaf dock (RUMOB, *Rumex obtusifolius*), wild pansy (VIOTR, *Viola tricolor*), Canadian thistle (CIRAR, *Cirsium arvense*), spring rape (BRSNN, *Brassica napus*), giant foxtail (SETFA, *Setaria faberi*), kochia (KCHSC, *Kochia scoparia*), wild oat (AVEFA, *Avena fatua*), barnyard grass (ECHCG, *Echinochloa crus-galli*), and large crabgrass (DIGSA, *Digitaria sanguinalis*), to determine the efficacy of the compositions on these undesirable vegetation species.

The results are summarized in Table 1 below.

TABLE 1

Herbicidal Effects (% visual injury) of Compound A and Bifenox on weeds.

| Application rate (g/ha) | Compound A Bifenox | 7.5 0 | 10 0 | 0 90 | 7.5 90 | 10 90 |
|---|---|---|---|---|---|---|
| RUMOB | Obs | 13 | 8 | 0 | 65 | 88 |
|  | Exp | — | — | — | 13 | 8 |
|  | Δ |  |  |  | 53 | 80 |
| VIOTR | Obs | 45 | 15 | 0 | 15 | 40 |
|  | Exp | — | — | — | 45 | 15 |
|  | Δ |  |  |  | −30 | 25 |
| CIRAR | Obs | 70 | 68 | 18 | 70 | 68 |
|  | Exp |  |  |  | 75 | 73 |
|  | Δ |  |  |  | −5 | −6 |
| BRSNN | Obs | 23 | 45 | 23 | 68 | 78 |
|  | Exp |  |  |  | 40 | 57 |
|  | Δ |  |  |  | 28 | 20 |
| SETFA | Obs | 60 | 78 | 18 | 75 | 75 |
|  | Exp | — | — | — | 67 | 81 |
|  | Δ |  |  |  | 8 | −6 |
| KCHSC | Obs | 63 | 70 | 73 | 75 | 80 |
|  | Exp | — | — | — | 90 | 92 |
|  | Δ |  |  |  | −15 | −12 |
| AVEFA | Obs | 0 | 0 | 5 | 8 | 10 |
|  | Exp | — | — | — | 5 | 5 |
|  | Δ |  |  |  | 3 | 5 |
| ECHCG | Obs | 80 | 88 | 15 | 75 | 85 |
|  | Exp | — | — | — | 83 | 89 |
|  | Δ |  |  |  | −8 | −4 |
| DIGSA | Obs | 13 | 25 | 25 | 28 | 38 |
|  | Exp | — | — | — | 34 | 44 |
|  | Δ |  |  |  | −7 | −6 | g/ha = grams per hectare
RUMOB = *Rumex obtusifolius* (broad-leaf dock)
VIOTR = *Viola tricolor* (wild pansy)
CIRAR = *Cirsium arvense* (Canadian thistle)
BRSNN = *Brassica napus* (spring rape)
SETFA = *Setaria faberi* (giant foxtail)
KCHSC = *Kochia scoparia* (kochia)
AVEFA = *Avena fatua* (wild oat)
ECHCG = *Echinochloa crus-galli* (barnyard grass)
DIGSA = *Digitaria sanguinalis* (large crabgrass)

Example 2

Compositions comprising Compound A and saflufenacil were tested to determine the efficacy of the compositions on undesirable vegetation species, including velvetleaf (ABUTH, *Abutilon theophrasti*), spring rape (BRSNN, *Brassica napus*), giant foxtail (SETFA, *Setaria faberi*), sorghum (SORVU, *Sorghum vulgare*), nutsedge (CYPES, *Cyperus esculentus*), broad-leaf dock (RUMOB, *Rumex obtusifolius*), and pigweed (AMARE, *Amaranthus retroflexus*). The compositions were also tested on spring wheat (TRZAS) and maize (ZEAMX), and the phytotoxicity of the compositions on each crop was measured.

The results are summarized in Table 2 below.

TABLE 2

Herbicidal Effects (% visual injury) of Compound A and Saflufenacil on weed and grain crops.

| Application rate (g/ha) | Compound A Saflufenacil | 7.5 0 | 10 0 | 0 11.2 | 7.5 11.2 | 10 11.2 |
|---|---|---|---|---|---|---|
| ABUTH | Obs | 68 | 80 | 98 | 100 | 100 |
|  | Exp | — | — | — | 99 | 100 |
|  | Δ |  |  |  | 1 | 1 |
| BRSNN | Obs | 65 | 65 | 90 | 100 | 100 |
|  | Exp | — | — | — | 97 | 97 |
|  | Δ |  |  |  | 4 | 4 |
| SETFA | Obs | 78 | 80 | 53 | 73 | 80 |
|  | Exp | — | — | — | 89 | 91 |
|  | Δ |  |  |  | −17 | −11 |
| SORVU | Obs | 0 | 0 | 33 | 48 | 50 |
|  | Exp | — | — | — | 33 | 33 |
|  | Δ |  |  |  | 15 | 18 |
| CYPES | Obs | 30 | 8 | 28 | 58 | 73 |
|  | Exp | — | — | — | 49 | 33 |
|  | Δ |  |  |  | 8 | 40 |
| RUMOB | Obs | 20 | 13 | 100 | 100 | 95 |
|  | Exp | — | — | — | 100 | 100 |
|  | Δ |  |  |  | 0 | −5 |
| AMARE | Obs | 88 | 88 | 100 | 100 | 100 |
|  | Exp | — | — | — | 100 | 100 |
|  | Δ |  |  |  | 0 | 0 |
| TRZAS | Obs | 5 | 3 | 10 | 8 | 10 |
|  | Exp | — | — | — | 15 | 12 |
|  | Δ |  |  |  | −7 | −2 |
| ZEAMX | Obs | 0 | 0 | 45 | 65 | 80 |
|  | Exp | — | — | — | 45 | 45 |
|  | Δ |  |  |  | 20 | 35 | g/ha = grams per hectare
ABUTH = *Abutilon theophrasti* (velvetleaf)
BRSNN = *Brassica napus* (spring rape)
SETFA = *Setaria faberi* (giant foxtail)
SORVU = *Sorghum vulgare* (sorghum)
CYPES = *Cyperus esculentus* (nutsedge)
RUMOB = *Rumex obtusifolius* (broad-leaf dock)
AMARE = *Amaranthus retroflexus* (pigweed)
TRZAS = *Triticum aestivum* (spring wheat)
ZEAMX = *Zea mays* (maize)

Example 3

Compositions comprising Compound A and carfentrazone-ethyl were tested to determine the efficacy of the compositions on undesirable vegetation species, including wild buckwheat (POLCO, *Polygonum convolvulus*), Russian thistle (SASKR, *Salsola kali*), and kochia (KCHSC, *Kochia scoparia*). The compositions were also tested on spring wheat (TRZAS) and spring barley (HORVS), and the phytotoxicity of the compositions on each crop was measured.

The results are summarized in Table 3 below.

TABLE 3

Herbicidal Effects (% visual injury) of Compound A and Carfentrazone-ethyl on weed and grain crops.

| Application rate (g/ha) | Compound A<br>Carfentrazone-ethyl | 7.5<br>0 | 10<br>0 | 0<br>5 | 7.5<br>5 | 10<br>5 |
|---|---|---|---|---|---|---|
| POLCO | Obs | 70 | 78 | 5 | 100 | 100 |
|  | Exp | — | — | — | 72 | 79 |
|  | Δ |  |  |  | 28 | 21 |
| SASKR | Obs | 45 | 60 | 68 | 97 | 88 |
|  | Exp | — | — | — | 82 | 87 |
|  | Δ |  |  |  | 15 | 1 |
| KCHSC | Obs | 50 | 58 | 20 | 70 | 78 |
|  | Exp | — | — | — | 60 | 66 |
|  | Δ |  |  |  | 10 | 12 |
| TRZAS | Obs | 0 | 0 | 0 | 0 | 0 |
|  | Exp | — | — | — | 0 | 0 |
|  | Δ |  |  |  | 0 | 0 |
| HORVS | Obs | 8 | 0 | 8 | 15 | 20 |
|  | Exp | — | — | — | 14 | 8 |
|  | Δ |  |  |  | 1 | 13 | g/ha = grams per hectare
POLCO = *Polygonum convolvulus* (wild buckwheat)
SASKR = *Salsola kali* (Russian thistle)
KCHSC = *Kochia scoparia* (kochia)
TRZAS = *Triticum aestivum* (spring wheat)
HORVS = *Hordeum vulgare* (spring barley)

Example 4

Compositions comprising Compound A and pyraclonil were tested to determine the efficacy of the compositions on undesirable vegetation species, including spring rape (BRSNN, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), and common lambsquarters (CHEAL, *Chenopodium album* L.), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 4 below.

TABLE 4

Herbicidal Effects (% visual injury) of Compound A and Pyraclonil on weed and grain crops.

| Application rate (g/ha) | Compound A<br>Pyraclonil | 7.5<br>0 | 10<br>0 | 0<br>42.5 | 7.5<br>42.5 | 10<br>42.5 |
|---|---|---|---|---|---|---|
| BRSNN | Obs | 55 | 60 | 23 | 100 | 100 |
|  | Exp | — | — | — | 65 | 69 |
|  | Δ |  |  |  | 35 | 31 |
| POLCO | Obs | 70 | 78 | 20 | 100 | 100 |
|  | Exp | — | — | — | 76 | 82 |
|  | Δ |  |  |  | 24 | 18 |
| SINAR | Obs | 88 | 92 | 15 | 100 | 100 |
|  | Exp | — | — | — | 89 | 93 |
|  | Δ |  |  |  | 11 | 7 |
| SASKR | Obs | 45 | 60 | 78 | 92 | 96 |
|  | Exp | — | — | — | 88 | 91 |
|  | Δ |  |  |  | 4 | 5 |
| KCHSC | Obs | 50 | 58 | 15 | 73 | 80 |
|  | Exp | — | — | — | 58 | 64 |
|  | Δ |  |  |  | 15 | 16 |
| CHEAL | Obs | 70 | 83 | 15 | 100 | 89 |
|  | Exp | — | — | — | 75 | 85 |
|  | Δ |  |  |  | 26 | 12 |
| TRZAS | Obs | 0 | 0 | 3 | 2 | 2 |
|  | Exp | — | — | — | 3 | 3 |
|  | Δ |  |  |  | -1 | -1 |
| HORVS | Obs | 8 | 0 | 28 | 33 | 5 |
|  | Exp | — | — | — | 42 | 38 |
|  | Δ |  |  |  | -10 | -33 | g/ha = grams per hectare
BRSNN = *Brassica napus* (spring rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album* L. (common lambsquarters))
TRZAS = *Triticum aestivum* (spring wheat)
HORVS = *Hordeum vulgare* (spring barley)

Example 5

Herbicidal compositions comprising Compound A and pyraflufen-ethyl were tested on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the herbicidal compositions on these undesirable vegetation species. The herbicidal compositions were also tested on spring wheat (TRZAS) and spring barley (HORVS), and the phytotoxicity of the herbicidal compositions on each crop was measured.

The results are summarized in Table 5 below.

TABLE 5

Herbicidal Effects (% visual injury) of Compound A and Pyraflufen-ethyl on weeds and grain crops.

| Application rate (g/ha) | Compound A<br>Pyraflufen-ethyl | 7.5<br>0 | 10<br>0 | 0<br>6 | 7.5<br>6 | 10<br>6 |
|---|---|---|---|---|---|---|
| AMARE | Obs | 90 | 85 | 18 | 95 | 94 |
|  | Exp | — | — | — | 92 | 88 |
|  | Δ |  |  |  | 3 | 6 |
| BRSNW | Obs | 35 | 40 | 0 | 28 | 50 |
|  | Exp | — | — | — | 35 | 40 |
|  | Δ |  |  |  | -8 | 10 |
| CHEAL | Obs | 75 | 80 | 5 | 88 | 88 |
|  | Exp | — | — | — | 76 | 81 |
|  | Δ |  |  |  | 11 | 7 |
| CIRAR | Obs | 40 | 55 | 10 | 55 | 60 |
|  | Exp | — | — | — | 46 | 60 |
|  | Δ |  |  |  | 9 | 1 |
| KCHSC | Obs | 70 | 70 | 0 | 78 | 80 |
|  | Exp | — | — | — | 70 | 70 |
|  | Δ |  |  |  | 8 | 10 |
| MATCH | Obs | 10 | 20 | 0 | 25 | 45 |
|  | Exp | — | — | — | 10 | 20 |
|  | Δ |  |  |  | 15 | 25 |
| POLCO | Obs | 30 | 43 | 0 | 68 | 65 |
|  | Exp | — | — | — | 30 | 43 |
|  | Δ |  |  |  | 38 | 23 |
| SASKR | Obs | 60 | 63 | 5 | 75 | 78 |
|  | Exp | — | — | — | 62 | 64 |
|  | Δ |  |  |  | 13 | 13 |
| SINAR | Obs | 83 | 88 | 0 | 95 | 94 |
|  | Exp | — | — | — | 83 | 88 |
|  | Δ |  |  |  | 13 | 6 |

TABLE 5-continued

Herbicidal Effects (% visual injury) of Compound
A and Pyraflufen-ethyl on weeds and grain crops.

| Application rate (g/ha) | Compound A Pyraflufen-ethyl | | 7.5 0 | 10 0 | 0 6 | 7.5 6 | 10 6 |
|---|---|---|---|---|---|---|---|
| TRZAS | Obs | | 0 | 0 | 0 | 0 | 0 |
|  | Exp | | — | — | — | 0 | 0 |
|  | Δ | | | | | 0 | 0 |
| HORVS | Obs | | 0 | 0 | 0 | 0 | 0 |
|  | Exp | | — | — | — | 0 | 0 |
|  | Δ | | | | | 0 | 0 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
TRZAS = *Triticum aestivum* (spring wheat)
HORVS = *Hordeum vulgare* (spring barley)

Example 6

Herbicidal compositions comprising Compound A and oxyfluorfen were tested on undesirable vegetation species, including kochia (KCHSC, *Kochia scoparia*), Canadian thistle (CIRAR, *Cirsium arvense*), Russian thistle (SASKR, *Salsola kali*), purple deadnettle (LAMPU, *Lamium purpureum*), shepherd's purse (CAPBP, *Capsella bursa-pastoris*), wild pansy (VIOTR, *Viola tricolor*), cornflower (CENCY, *Cyanus segetum*), field violet (VIOAR, *Viola arvensis*), common chickweed (STEME, *Stellaria media*), scentless chamomile (MATIN, *Matricaria inodora*), corn chamomile (ANTAR, *Anthemis arvensis*), pineapple weed (MATMT, *Matricaria discoidea*), wild chamomile (MATCH, *Matricaria chamomilla*), Persian speedwell (VERPE, *Veronica persica*), common poppy (PAPRH, *Papaver rhoeas*), ivy-leaved speedwell (VERHE, *Veronica hederifolia*), herbicide-resistant poppy (PAPRH-RES, *Papaver rhoeas*), wild mustard (SINAR, *Sinapis arvensis*), winter rape (BRSNW, *Brassica napus*), and wild buckwheat (POLCO, *Polygonum convolvulus*), to determine the efficacy of the herbicidal compositions on these undesirable vegetation species. The herbicidal compositions were also tested on spring wheat (TRZAS), winter wheat (TRZAW), winter barley (HORVW) and spring barley (HORVS), and the phytotoxicity of the herbicidal compositions on each crop was measured.

The results are summarized in Table 6 below.

TABLE 6

Herbicidal Effects (% visual injury) of Compound
A and Oxyfluorfen on weeds and grain crops

| Application Rate (g/ha) | Compound A Oxyfluorfen | | 7.5 0 | 10 0 | 15 0 | 0 560 | 7.5 560 | 10 560 | 15 560 |
|---|---|---|---|---|---|---|---|---|---|
| KCHSC | Obs | | 63 | 65 | 63 | 55 | 95 | 95 | 98 |
|  | Exp | | — | — | — | — | 83 | 84 | 83 |
|  | Δ | | | | | | 12 | 11 | 14 |
| CIRAR | Obs | | 50 | 63 | 63 | 35 | 73 | 75 | 78 |
|  | Exp | | — | — | — | — | 68 | 76 | 76 |
|  | Δ | | | | | | 5 | −1 | 2 |
| SASKR | Obs | | 50 | 60 | 63 | 60 | 88 | 85 | 88 |
|  | Exp | | — | — | — | — | 80 | 84 | 85 |
|  | Δ | | | | | | 8 | 1 | 3 |
| LAMPU | Obs | | 68 | 73 | 73 | 10 | 70 | 80 | 85 |
|  | Exp | | — | — | — | — | 71 | 75 | 75 |
|  | Δ | | | | | | −1 | 5 | 10 |
| CAPBP | Obs | | 45 | 55 | 55 | 0 | 73 | 73 | 83 |
|  | Exp | | — | — | — | — | 45 | 55 | 55 |
|  | Δ | | | | | | 28 | 18 | 28 |
| VIOTR | Obs | | 13 | 15 | 15 | 60 | 70 | 63 | 73 |
|  | Exp | | — | — | — | — | 65 | 66 | 66 |
|  | Δ | | | | | | 5 | −4 | 7 |
| CENCY | Obs | | 75 | 78 | 80 | 15 | 83 | 90 | 88 |
|  | Exp | | — | — | — | — | 79 | 81 | 83 |
|  | Δ | | | | | | 4 | 9 | 5 |
| VIOAR | Obs | | 10 | 13 | 10 | 40 | 53 | 48 | 48 |
|  | Exp | | — | — | — | — | 46 | 48 | 46 |
|  | Δ | | | | | | 7 | 0 | 2 |
| STEME | Obs | | 85 | 88 | 89 | 0 | 65 | 68 | 78 |
|  | Exp | | — | — | — | — | 85 | 88 | 89 |
|  | Δ | | | | | | −20 | −20 | −12 |
| MATIN | Obs | | 55 | 60 | 83 | 0 | 80 | 75 | 96 |
|  | Exp | | — | — | — | — | 55 | 60 | 83 |
|  | Δ | | | | | | 25 | 15 | 14 |
| ANTAR | Obs | | 68 | 70 | 88 | 5 | 65 | 75 | 78 |
|  | Exp | | — | — | — | — | 69 | 72 | 88 |
|  | Δ | | | | | | −4 | 4 | −11 |
| MATMT | Obs | | 20 | 20 | 63 | 5 | 25 | 48 | 45 |
|  | Exp | | — | — | — | — | 24 | 24 | 64 |
|  | Δ | | | | | | 1 | 24 | −19 |
| MATCH | Obs | | 23 | 35 | 45 | 25 | 30 | 50 | 45 |
|  | Exp | | — | — | — | — | 42 | 51 | 59 |
|  | Δ | | | | | | −12 | −1 | −14 |

TABLE 6-continued

| | Herbicidal Effects (% visual injury) of Compound A and Oxyfluorfen on weeds and grain crops | | | | | | | |
|---|---|---|---|---|---|---|---|---|
| Application Rate (g/ha) | Compound A | 7.5 | 10 | 15 | 0 | 7.5 | 10 | 15 |
| | Oxyfluorfen | 0 | 0 | 0 | 560 | 560 | 560 | 560 |
| VERPE | Obs | 78 | 90 | 93 | 20 | 93 | 98 | 99 |
| | Exp | — | — | — | — | 82 | 92 | 94 |
| | Δ | | | | | 11 | 6 | 5 |
| PAPRH | Obs | 100 | 99 | 100 | 70 | 100 | 100 | 100 |
| | Exp | — | — | — | — | 100 | 100 | 100 |
| | Δ | | | | | 0 | 0 | 0 |
| VERHE | Obs | 68 | 73 | 75 | 5 | 80 | 80 | 85 |
| | Exp | — | — | — | — | 69 | 74 | 76 |
| | Δ | | | | | 11 | 6 | 9 |
| PAPRH-RES | Obs | 96 | 98 | 100 | 45 | 98 | 100 | 100 |
| | Exp | — | — | — | — | 98 | 99 | 100 |
| | Δ | | | | | 0 | 1 | 0 |
| SINAR | Obs | 88 | 91 | 91 | 20 | 98 | 99 | 98 |
| | Exp | — | — | — | — | 90 | 93 | 93 |
| | Δ | | | | | 8 | 6 | 5 |
| BRSNW | Obs | 60 | 65 | 73 | 20 | 90 | 96 | 97 |
| | Exp | — | — | — | — | 68 | 72 | 78 |
| | Δ | | | | | 22 | 24 | 19 |
| POLCO | Obs | 65 | 78 | 85 | 80 | 100 | 100 | 100 |
| | Exp | — | — | — | — | 93 | 96 | 97 |
| | Δ | | | | | 7 | 5 | 3 |
| TRZAS | Obs | 0 | 0 | 0 | 23 | 23 | 23 | 25 |
| | Exp | — | — | — | — | 23 | 23 | 23 |
| | Δ | | | | | 0 | 0 | 3 |
| TRZAW | Obs | 0 | 0 | 0 | 20 | 23 | 23 | 20 |
| | Exp | — | — | — | — | 20 | 20 | 20 |
| | Δ | | | | | 3 | 3 | 0 |
| HORVW | Obs | 0 | 0 | 0 | 50 | 60 | 70 | 78 |
| | Exp | — | — | — | — | 50 | 50 | 50 |
| | Δ | | | | | 10 | 20 | 28 |
| HORVS | Obs | 0 | 0 | 0 | 70 | 70 | 70 | 78 |
| | Exp | — | — | — | — | 70 | 70 | 70 |
| | Δ | | | | | 0 | 0 | 8 | g/ha = grams per hectare
KCHSC = *Kochia scoparia* (kochia)
CIRAR = *Cirsium arvense* (Canadian thistle)
SASKR = *Salsola kali* (Russian thistle)
LAMPU = *Lamium purpureum* (purple deadnettle)
CAPBP = *Capsella bursa-pastoris* (shepherd's purse)
VIOTR = *Viola tricolor* (wild pansy)
CENCY = *Cyanus segetum* (cornflower)
VIOAR = *Viola arvensis* (field violet)
STEME = *Stellaria media* (chickweed)
MATIN = *Matricaria inodora* (scentless chamomile)
ANTAR = *Anthemis arvensis* (corn chamomile)
MATMT = *Matricaria discoidea* (pineapple weed)
MATCH = *Matricaria chamomilla* (wild chamomile)
VERPE = *Veronica persica* (Persian speedwell)
PAPRH = *Papaver rhoeas* (common poppy)
VERHE = *Veronica hederifolia* (ivy-leaved speedwell)
PAPRH-RES = *Papaver rhoeas* (herbicide-resistant poppy)
SINAR = *Sinapis arvensis* (wild mustard)
BRSNW = *Brassica napus* (winter rape)
POLCO = *Polygonum convolvulus* (wild buckwheat)
TRZAS = *Triticum aestivum* (spring wheat)
TRZAW = *Triticum aestivum* (winter wheat)
HORVW = *Hordeum vulgare* (winter barley)
HORVS = *Hordeum vulgare* (spring barley)

Example 7

Compositions comprising Compound B and saflufenacil were tested on undesirable vegetation species, including Canadian thistle (CIRAR, *Cirsium arvense*), giant foxtail (SETFA, *Setaria faberi*), and wild pansy (VIOTR, *Viola tricolor*), to determine the efficacy of the compositions on these undesirable vegetation species.

The results are summarized in Table 7 below.

TABLE 7

Herbicidal Effects (% visual injury) of Compound B and Saflufenacil on weeds.

| Application rate (g/ha) | Compound B | 7.5 | 10 | 0 | 7.5 | 10 |
|---|---|---|---|---|---|---|
| | Saflufenacil | 0 | 0 | 1 | 1 | 1 |
| CIRAR | Obs | 45 | 45 | 80 | 100 | 100 |
| | Exp | — | — | — | 89 | 89 |
| | Δ | | | | 11 | 11 |
| SETFA | Obs | 70 | 55 | 13 | 85 | 85 |
| | Exp | — | — | — | 74 | 61 |
| | Δ | | | | 11 | 24 |
| VIOTR | Obs | 10 | 40 | 55 | 75 | 80 |
| | Exp | — | — | — | 60 | 73 |
| | Δ | | | | 16 | 7 | g/ha = grams per hectare
CIRAR = *Cirsium arvense* (Canadian thistle)
SETFA = *Setaria faberi* (giant foxtail)
VIOTR = *Viola tricolor* (wild pansy)

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various aspects, the terms "consisting essentially of" and "consisting of" can be used in place of "comprising" and "including" to provide for more specific aspects and are also disclosed. Other than in the examples, or where otherwise noted, all numbers expressing quantities of ingredients, reaction conditions, and so forth used in the specification and claims are to be understood to be construed in light of the number of significant digits and ordinary rounding approaches, and not as an attempt to limit the application of the doctrine of equivalents to the scope of the claims.

What is claimed is:

1. A composition, comprising:
   (a) a pyridine carboxylate herbicide defined by Formula (I):

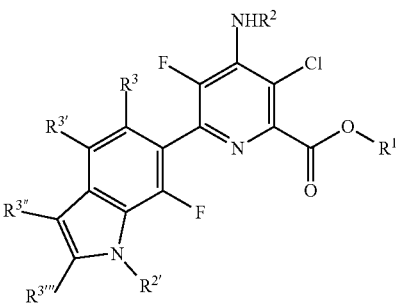

Formula (I)

wherein:
$R^1$ is cyanomethyl or propargyl;
$R^2$ and $R^{2'}$ are independently hydrogen;
$R^3$, $R^{3'}$, $R^{3''}$, and $R^{3'''}$ are independently hydrogen;
or an agriculturally acceptable salt thereof; and
   (b) a protoporphyrinogen oxidase (PROTOX) inhibitor herbicide selected from the group consisting of bifenox, saflufenacil, carfentrazone, pyraclonil, pyraflufen, oxyfluorfen, an agriculturally acceptable salt thereof, and an agriculturally acceptable ester thereof;
wherein the weight ratio of (a) in g ae to (b) in g ai is from 1:100 to 15:1.

2. The composition of claim 1, wherein the pyridine carboxylate herbicide compound is cyanomethyl 4-amino-3-chloro-5-fluoro-6-(7-fluoro-1H-indol-6-yl) pyridine-2-carboxylate:

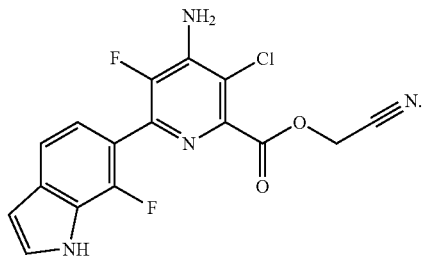 [SMILES: N#CCOC(=O)c1nc(-c2ccc3cc[nH]c3c2F)c(F)c(N)c1Cl]

3. The composition of claim 1, wherein the pyridine carboxylate herbicide compound is propargyl 4-amino-3-chloro-5-fluoro-6-(7-fluoro-1H-indol-6-yl) pyridine-2-carboxylate:

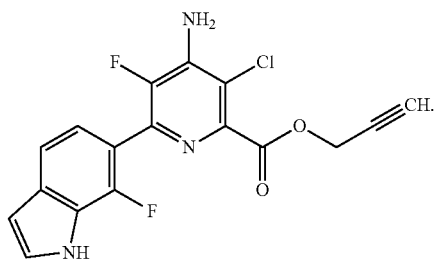 [SMILES: C#CCOC(=O)c1nc(-c2ccc3cc[nH]c3c2F)c(F)c(N)c1Cl]

4. The composition of claim 1, wherein the weight ratio of the pyridine carboxylate herbicide in g ae to the PROTOX inhibitor herbicide in g ai is from 1:80 to 10:1.

5. The composition of claim 1, further comprising a safener.

6. The composition of claim 1, further comprising an additional pesticide.

7. The composition of claim 1, wherein the composition does not include a herbicidal active ingredient in addition to (a) and (b).

8. A method of controlling undesirable vegetation, comprising applying to vegetation or an area adjacent the vegetation or applying to soil or water to limit the emergence or growth of vegetation a composition, comprising:
 (a) a pyridine carboxylate herbicide defined by Formula (I):

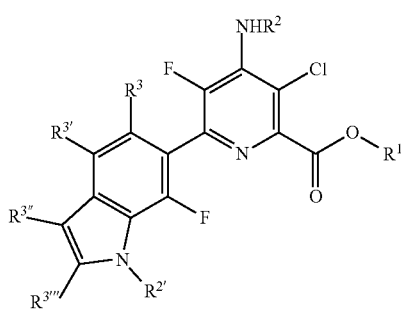

Formula (I)

wherein
 $R^1$ is cyanomethyl or propargyl;
 $R^2$ and $R^{2'}$ are independently hydrogen;
 $R^3$, $R^{3'}$, $R^{3''}$, and $R^{3'''}$ are independently hydrogen;
 or an agriculturally acceptable salt thereof; and
 (b) a protoporphyrinogen oxidase (PROTOX) inhibitor herbicide selected from the group consisting of bifenox, saflufenacil, carfentrazone, pyraclonil, pyraflufen, oxyfluorfen, an agriculturally acceptable salt thereof, and an agriculturally acceptable ester thereof;
 wherein the pyridine carboxylate herbicide is applied in an amount of at least 0.1 g ae/ha;
 wherein the PROTOX inhibitor herbicide is applied in an amount of at least 1 g ai/ha;
 wherein the weight ratio of (a) in g ae to (b) in g ai is from 1:100 to 15:1.

9. The method of claim 8, wherein the pyridine carboxylate herbicide compound is cyanomethyl 4-amino-3-chloro-5-fluoro-6-(7-fluoro-1H-indol-6-yl) pyridine-2-carboxylate:

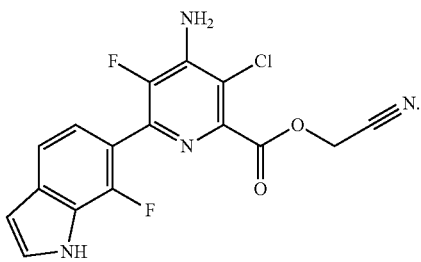 [SMILES: N#CCOC(=O)c1nc(-c2ccc3cc[nH]c3c2F)c(F)c(N)c1Cl]

10. The method of claim 8, wherein the pyridine carboxylate herbicide compound is propargyl 4-amino-3-chloro-5-fluoro-6-(7-fluoro-1H-indol-6-yl) pyridine-2-carboxylate:

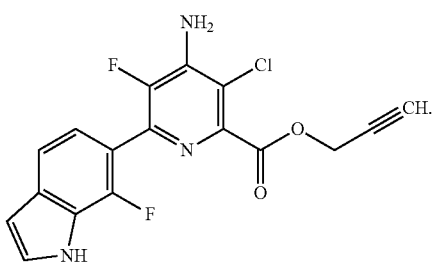 [SMILES: C#CCOC(=O)c1nc(-c2ccc3cc[nH]c3c2F)c(F)c(N)c1Cl]

11. The method of claim 8, wherein the pyridine carboxylate herbicide is provided in amount of 0.1 g ae/ha to 300 g ae/ha.

12. The method of claim 8, wherein weight ratio of the pyridine carboxylate herbicide in g ae to the PROTOX inhibitor herbicide in g ai is from 1:80 to 10:1.

13. The method of claim 8, further comprising applying a safener.

14. The method of claim 8, further comprising applying an additional pesticide.

15. The method of claim 8, wherein the composition does not include a herbicidal active ingredient in addition to (a) and (b).

* * * * *